US009703485B2

United States Patent
Hall et al.

(10) Patent No.: US 9,703,485 B2
(45) Date of Patent: Jul. 11, 2017

(54) STORAGE MANAGEMENT IN HYBRID DRIVES

(71) Applicant: HGST Netherlands B.V., Amsterdam (NL)

(72) Inventors: David Robison Hall, Rochester, MN (US); Mark Andrew Jerde, Rochester, MN (US)

(73) Assignee: WESTERN DIGITAL TECHNOLOGIES, INC., Irvine, CA (US)

( * ) Notice: Subject to any disclaimer, the term of this patent is extended or adjusted under 35 U.S.C. 154(b) by 176 days.

(21) Appl. No.: 14/800,637

(22) Filed: Jul. 15, 2015

(65) Prior Publication Data

US 2017/0017398 A1    Jan. 19, 2017

(51) Int. Cl.
G06F 3/00    (2006.01)
G06F 3/06    (2006.01)

(52) U.S. Cl.
CPC ............ *G06F 3/0604* (2013.01); *G06F 3/064* (2013.01); *G06F 3/0659* (2013.01); *G06F 3/0685* (2013.01)

(58) Field of Classification Search
None
See application file for complete search history.

(56) References Cited

U.S. PATENT DOCUMENTS

| 8,151,064 | B2 | 4/2012 | Lee |
| 8,438,334 | B2 | 5/2013 | Bell, Jr. et al. |
| 8,612,699 | B2 | 12/2013 | Jain et al. |
| 8,838,916 | B2 | 9/2014 | Cao et al. |
| 2008/0024899 | A1 | 1/2008 | Chu et al. |
| 2010/0088459 | A1 | 4/2010 | Arya et al. |
| 2011/0145489 | A1 | 6/2011 | Yu et al. |

(Continued)

FOREIGN PATENT DOCUMENTS

WO    2011/019216 A9    2/2011

OTHER PUBLICATIONS

Budiman et al; "Hybrid Drive with Large Capacity and High-Speed Performance"; Toshiba Storage Products for ICT Society, pp. 37-40; http://toshiba.semicon-storage.com/product/storage/pdf/Hybrid_Drive_E.pdf.

(Continued)

*Primary Examiner* — David X Yi
*Assistant Examiner* — Craig Goldschmidt
(74) *Attorney, Agent, or Firm* — Loza & Loza, LLP; Gabriel Fitch

(57) ABSTRACT

Methods for deciding whether to store data in a non-volatile memory (NVM) storage portion of a hybrid drive including the NVM storage portion and a disk storage portion are provided. One such method involves generating a queue for storing candidate addresses and a priority level for each of the candidate addresses, receiving a read command and a range of addresses for the disk storage portion, determining a relative distance between reads of a first address corresponding with a second address within the range of addresses, storing, when the relative distance is less than a relative distance threshold, a first candidate address, corresponding to the second address, and a respective priority level in the queue, and storing, when the priority level of the first candidate address is greater than a priority level threshold, data corresponding to the first candidate address in the NVM storage portion.

24 Claims, 21 Drawing Sheets

(56) References Cited

U.S. PATENT DOCUMENTS

2013/0238832 A1    9/2013   Dronamraju et al.

OTHER PUBLICATIONS

Park et al; "PRAM and NAND flash hybrid architecture based on hot data detection"; Mechanical and Electronics Engineering (ICMEE), 2010 2nd Intl COnference on, vol. 1 No., pp. V1-93, V1-97, Aug. 1-3, 2010; doi: 10.1109/ICMEE.2010-5558587; http://ieeexplore.ieee.org/stamp/stamp.jsp?tp=&arnumber=5558587&isnumber=5558502.

Seagate; "Adaptive Memory Technology in Solid State Hybrid Drives"; printed on Oct. 14, 2014; 3 pages; http://www.seagate.com/tech-insights/adaptive-memory-in-sshd-master-ti/.

Read Command

*Read Command*

Read Command

Read Command

Write Command

Write Command

STORAGE MANAGEMENT IN HYBRID DRIVES

FIELD

Aspects of the disclosure relate generally to hybrid drives, and more specifically, to storage management in hybrid drives.

BACKGROUND

Traditional hard disk drives (HDDs) have the capacity to store very large amounts of data at very reasonable costs per unit storage capacity. However, the performance of such drives in terms of input/output speed is significantly behind the speed of central processing units and various system buses. Accordingly, the transfer of data to and from hard disk drives presents a significant bottleneck to overall computer system performance.

Modern solid state drives (SSDs) provide high speed non-volatile storage, but their cost per unit of storage capacity is substantially higher than that of hard disk drives. Thus, it may not be cost effective to simply replace HDDs with SSDs. However, hybrid storage systems, which include a combination of HDDs and SSDs offer benefits from both storage technologies. In hybrid storage systems most of the data is stored in the HDD part of the system while a subset of the data is stored in the SSD part of the system.

Current hybrid storage caching techniques can make a determination of where to store the data based on how often a particular file is accessed. Less frequently accessed data, which might be referred to as cold data, can be stored in the HDD part of the hybrid storage system, while more frequently accessed data, which might be referred to as hot data, can be cached in the SSD part of the system. However, these conventional caching techniques can be inefficient and provide only limited control of characteristics to make this determination.

SUMMARY

In one aspect, the disclosure relates to a method for deciding whether to store data in a non-volatile memory (NVM) storage portion of a hybrid drive comprising the NVM storage portion and a disk storage portion, the method including generating a queue for storing a plurality of candidate addresses and a priority level for each of the plurality of candidate addresses, receiving a read command and a range of addresses for the disk storage portion of the hybrid drive, wherein the range of addresses corresponds to the read command, determining a relative distance between reads of a first address corresponding with a second address within the range of addresses, storing, when the relative distance is less than a relative distance threshold, a first candidate address, corresponding to the second address, and a respective priority level in the queue, and storing, when the priority level of the first candidate address is greater than a priority level threshold, data corresponding to the first candidate address in the NVM storage portion of the hybrid drive.

In another aspect, the disclosure relates to a method for deciding whether to store data at certain addresses in a non-volatile memory (NVM) storage portion of a hybrid drive comprising the NVM storage portion and a disk storage portion, the method including generating a queue for storing a plurality of candidate addresses and a priority level for each of the plurality of candidate addresses, increasing, when one or more read commands of a first candidate address of the plurality of candidate addresses are performed, the priority level for the first candidate address, decreasing, when one or more write commands of the first candidate address are performed, the priority level for the first candidate address, and storing, when the priority level for the first candidate address is greater than a preselected threshold, data corresponding to the first candidate address in the NVM storage portion of the hybrid drive.

DETAILED DESCRIPTION

Figure 1:
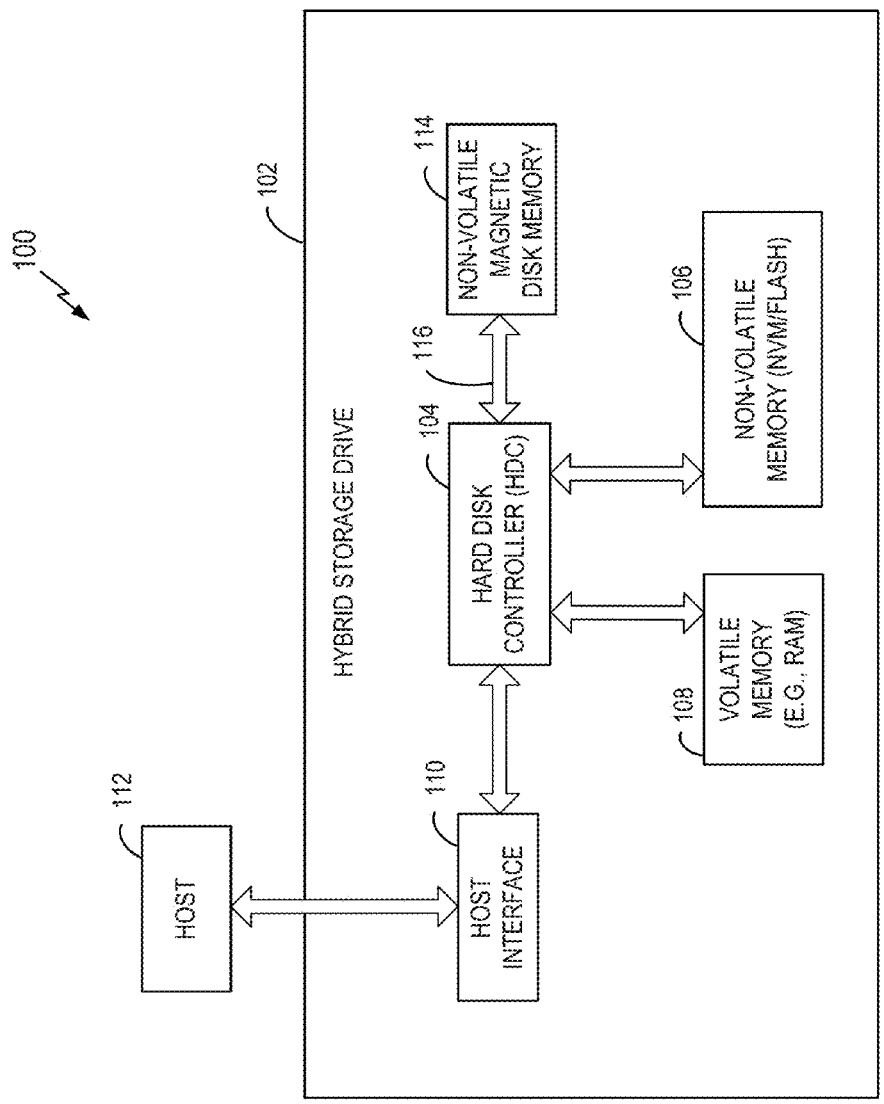
FIG. 1 is a block diagram of a storage system including a hybrid drive with a hard disk controller configured to determine whether to store data in a non-volatile memory (NVM) storage portion of the hybrid drive of select candidate addresses in accordance with one embodiment of the disclosure.

Referring now to the drawings, embodiments of methods for determining whether to store data in a non-volatile memory (NVM) storage portion of a hybrid drive of select candidate addresses are illustrated. One such method involves using a queue to track a priority level for candidate addresses, determining a relative distance between reads of addresses in the disk storage portion of the hybrid drive, storing candidate addresses in the queue when the relative distance is less than a relative distance threshold, and when a priority level of a first candidate address in the queue is greater than a priority level threshold, storing data corresponding to the first candidate address in the NVM storage portion of the hybrid drive. In one aspect, the method further involves increasing, when one or more read commands is performed, the priority level for the first candidate address and/or decreasing, when one or more write commands is performed, the priority level for the first candidate address. Another method involves determining whether to store data in a NVM storage portion of the hybrid drive of select candidate addresses where write commands decrease a priority for the candidate addresses. These methods can provide better efficiency than conventional techniques.

FIG. 1 is a block diagram of a storage system 100 including a hybrid drive 102 with a hard disk controller (HDC) 104 configured to determine whether to store data in a non-volatile memory (NVM) storage portion 106 of the hybrid drive 100 of select candidate addresses in accordance with one embodiment of the disclosure. The hard disk controller (HDC) 104 can include and/or be implemented by a microcontroller or microprocessor. The controller 104 runs one or more computer programs that are stored in local memory (not shown) or a separate volatile memory (e.g., random access memory or RAM) 108 and that stores instructions for the methods/processes described below. In one aspect, the local memory may be an embedded memory on a chip embodying the controller 104. The computer program may also be implemented in microcode or other type of memory accessible to the controller 104.

The controller 104 is connected to a host interface 110 that communicates with the host computer 112. The host computer 112 may be a portable computer that can operate from battery power, or any other type of computer. The host interface 110 may be any conventional computer to hard drive interface, such as Serial ATA (Advanced Technology Attachment) or SCSI (Small Computer System Interface).

The controller 104 is also connected to a non-volatile magnetic disk memory 114 which includes one or more read/write heads configured to read and write information to one or more rotating magnetic disks configured to store information. The heads can move across the surfaces of the magnetic recording disks to access concentric data tracks on the disks. The non-volatile disk memory 114 typically includes a stack of disks that are mounted on and rotated by a spindle motor, with each disk surface being accessed with one of the heads. The heads are moved across the concentric data tracks on the disk surfaces to the desired data tracks by an actuator. Further details of the operation of magnetic disk storage can be found in U.S. Patent Publ. No. 2008/0024899, the entire content of which is hereby incorporated by reference.

The controller 104 acts as a data controller to receive blocks of write data from the host computer 112 and transfer the write data through a read/write channel 116 for writing to the disks by the heads. The controller 104 also communicates with volatile memory 108 and non-volatile memory 106, possibly via a data bus (not shown). One type of volatile memory 108 may be dynamic random access memory (DRAM). One type of non-volatile memory 106 may be flash memory. Flash memory stores information in an array of floating gate transistors, called "cells", and can be electrically erased and reprogrammed in blocks. Because the drive 102 includes two types of non-volatile or "permanent" data storage media, the non-volatile memory 106 and the magnetic recording disks 114, it is sometimes called a "hybrid" disk drive.

In one aspect, the controller 104 can store and execute instructions for one or more processes for deciding whether to store data in the NVM 106. These instructions may be stored in a non-volatile memory of the controller 104 or other suitable memory.

In this context, the controller 104 can refer to any machine or selection of logic that is capable of executing a sequence of instructions and should be taken to include, but not limited to, general purpose microprocessors, special purpose microprocessors, central processing units (CPUs), digital signal processors (DSPs), application specific integrated circuits (ASICs), signal processors, microcontrollers, and other suitable circuitry. Further, it should be appreciated that the term processor, microprocessor, circuitry, controller, and other such terms, refer to any type of logic or circuitry capable of executing logic, commands, instructions, software, firmware, functionality, or other such information.

Figure 2:
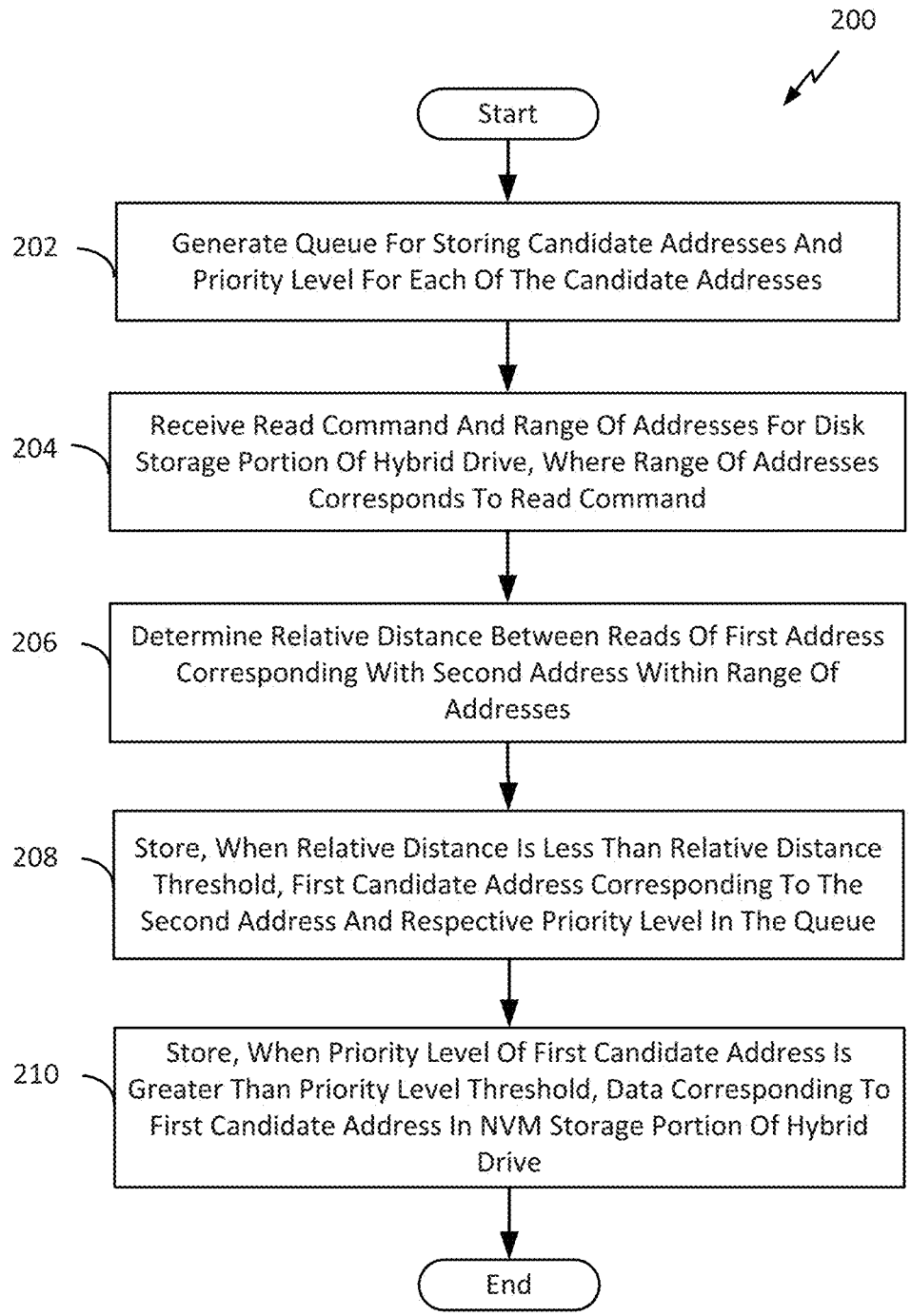
FIG. 2 is a flowchart of a general process for determining whether to store data in a non-volatile memory (NVM) storage portion of the hybrid drive of select candidate addresses involving determination of a relative distance between reads and a sufficient priority level for inclusion in accordance with one embodiment of the disclosure.

FIG. 2 is a flowchart of a general process for determining whether to store data in a non-volatile memory (NVM) storage portion of the hybrid drive of select candidate addresses involving determination of a relative distance between reads and a sufficient priority level for inclusion in accordance with one embodiment of the disclosure. In one aspect, the process can be performed using the hard disk controller 104 of FIG. 1. In block 202, the process generates a queue for storing a plurality of candidate addresses and a priority level for each of the plurality of candidate addresses. In one aspect, the queue can be referred to as a priority queue (PQ) and can be used to manage and store a priority level for each of the candidate addresses. The candidate addresses can be a collection of addresses (e.g., logical block addresses, LBAs, or portions thereof) being considered for inclusion (e.g., storage) in the NVM portion of the drive. As will be discussed in greater detail below, these candidate addresses can be selected based on preselected activities associated with the addresses, including reads and writes.

In block 204, the process receives a read command and a range of addresses for the disk storage portion of the hybrid drive, where the range of addresses corresponds to the read command. For example the read command might involve a read starting at address 0x123456 and a range of 0x10 such that addresses 0x123456 to 0x123465 are to be read.

In block 206, the process determines a relative distance between reads of a first address corresponding with a second address within the range of addresses. In one aspect, relative distance can be defined as a count of the number of reads between occurrences of the first address (e.g., see relative distance of 3 in FIG. 13 for address of "0x1534"). In one embodiment, the first address may be identical to the second address. In another embodiment, the first address may be a truncated version of the second address where some number of bits starting with the least significant bit of the second address has been removed. By truncating the address, the process may track less overall data thereby increasing efficiency and reducing storage costs. At the same time, some address precision may be lost in tracking individual addresses. However, the number of bits shaved can be selected such that the lost precision is acceptable to overall system performance. In a number of embodiments, the second address is one of the addresses in the range of addresses of the received read command.

In block 208, the process stores, when the relative distance is less than a relative distance threshold, a first candidate address corresponding to the second address and a respective priority level in the queue. In one embodiment, the respective priority level for the first candidate address is based on the relative distance. In one embodiment, the first candidate address may be identical to the second address. In another embodiment, the first candidate address may be a truncated version of the second address where some number of bits starting with the least significant bit of the second address has been removed. By truncating the address, the process may track less overall data thereby increasing efficiency and reducing storage costs. At the same time, some address precision may be lost in tracking individual addresses. However, the number of bits shaved can be selected such that the lost precision is acceptable to overall system performance.

In block 210, the process stores, when the priority level of the first candidate address is greater than a priority level threshold, data corresponding to the first candidate address in the NVM storage portion of the hybrid drive. In several aspects, the data corresponding to the first candidate address is the data already stored in the disk storage portion of the hybrid drive at the second address. In such case, the data may simply be copied to the NVM storage portion.

In one embodiment, the process further includes increasing, when one or more read commands of the second address is performed, the priority level for the first candidate address. In such case, the process can again store, when the priority level of the first candidate address is greater than the priority level threshold, data corresponding to the first candidate address in the NVM storage portion of the hybrid drive. Thus, depending on changes in the priority level, the process may store candidate data in the NVM storage portion.

In another embodiment, the process further includes decreasing, when one or more write commands of the second address is performed, the priority level for the first candidate address. In such case, the process can again store, when the priority level of the first candidate address is greater than the priority level threshold, data corresponding to the first candidate address in the NVM storage portion of the hybrid drive.

In another embodiment, the process further includes (1) determining a relative distance between reads of a third address corresponding with a fourth address within the range of addresses, (2) storing, when the relative distance of the third address is less than the relative distance threshold, a second candidate address corresponding to the fourth address and a respective priority level in the queue, and (3) determining an aggregate of the priority level for the first candidate address and the second candidate address. In such case, the storing, when the priority level of the first candidate address is greater than the priority level threshold, the data corresponding to the first candidate address in the NVM storage portion of the hybrid drive may include storing, when the aggregate is greater than a second preselected threshold, the data corresponding to the first candidate address and data corresponding to the second candidate address in the NVM storage portion of the hybrid drive. In several aspects the aggregate may be an average, a weighted average, or another suitable value. In one such aspect, these aggregate values may be weighted by the number of blocks associated with the first and second candidate addresses. For example, suppose that the first candidate address has a priority level of 1 and 4 blocks while the second candidate address has a priority level of 2 and 12 blocks. Thus, an average priority level is $((1\times4)+(2\times12))/16$ or 1.75.

In one embodiment, the process further includes splitting the first address into a slot value and a residual value, where the queue is implemented using an array having at least one index of slot values. In such case, the residual value can be stored in the array/queue. This will be discussed in greater detail below and in FIG. 14.

In one embodiment, the process further includes hashing the first address to remove locality (e.g., where locality is a degree of proximity from one address to another), and splitting the hashed first address into a slot value and a residual value, where the queue is implemented using an array having at least one index of slot values. In such case, the residual value can be stored in the array/queue. This will be discussed in greater detail below and in FIG. 14.

In one embodiment, the process may employ a good samaritan technique for maintaining a fitness of candidate addresses in the queue. More specifically, the process may include maintaining a count of all entries in the queue at each priority level and decreasing a priority level of a preselected entry in the queue if the count of entries for the priority level of the preselected entry is greater than a priority level threshold. In some embodiments, this good samaritan technique may be employed randomly. In other embodiments, the samaritan technique may be employed during a search of the queue (e.g., priority queue) as the search examines one or more entries in the queue. The good Samaritan technique can be useful for maintaining levels at desired entry counts despite not having a level-to-entries lookup mechanism. In other words, rather than being able to immediately select an entry to leave a level when an entry enters the level, the good Samaritan technique can allow the process to maintain the targets in a non-immediate manner.

In one embodiment, the process may employ a victim list technique for maintaining a fitness of candidate addresses in the queue. In such case, the process may include (1) maintaining a count of entries in the queue at each priority level, (2) maintaining a list of candidate addresses for each priority level, (3) determining whether the count of entries of a first priority level in the plurality of priority levels is greater than a priority level threshold, (4) selecting, if the count of entries of the first priority level is greater than the priority level threshold, a victim from the list of candidate addresses at the first priority level, and (5) decreasing, if the count of entries of the first priority level is greater than the priority level threshold, a priority level of the entry in the queue corresponding to the victim. The victim list technique can be useful for maintaining levels at desired entry counts despite not having a complete level-to-entries lookup mechanism. In other words, a lookup table can be maintained for a subset of entries, sufficient to allow immediate selection an entry to leave a level when an entry enters the level without the storage cost that a complete lookup table would entail.

In one embodiment, the process may employ a priority swap technique for maintaining a fitness of candidate addresses in the queue. In such case, the process may include (1) maintaining a list of candidate addresses for each priority level in the plurality of priority levels, (2) identifying a second candidate address in the queue for a priority promotion, (3) selecting a victim from the list of candidate addresses having a priority level higher than that of the second candidate address, (4) storing the priority level of the second candidate address as a former priority level, (5) setting the priority level of the second candidate address to the priority level of the victim, and (6) setting the priority level of the victim to the former priority level of the second candidate address. The priority swap technique can be useful for maintaining levels at desired entry counts despite not having a complete level-to-entries lookup mechanism and without chance for cascading decreases in priority level as each entry being decreased in priority level results in a need to remove an entry from the level receiving the decreased priority entry (e.g., level of demoted entry).

In one embodiment, the process can further include (1) maintaining a count of entries in the queue at each priority level in the plurality of priority levels, and (2) setting a maximum count threshold for each priority level based on a size of storage available in the NVM storage portion of the hybrid drive.

In one aspect, the process can perform the sequence of actions in a different order. In another aspect, the process can skip one or more of the actions. In other aspects, one or more of the actions are performed simultaneously. In some aspects, additional actions can be performed.

Figure 3:
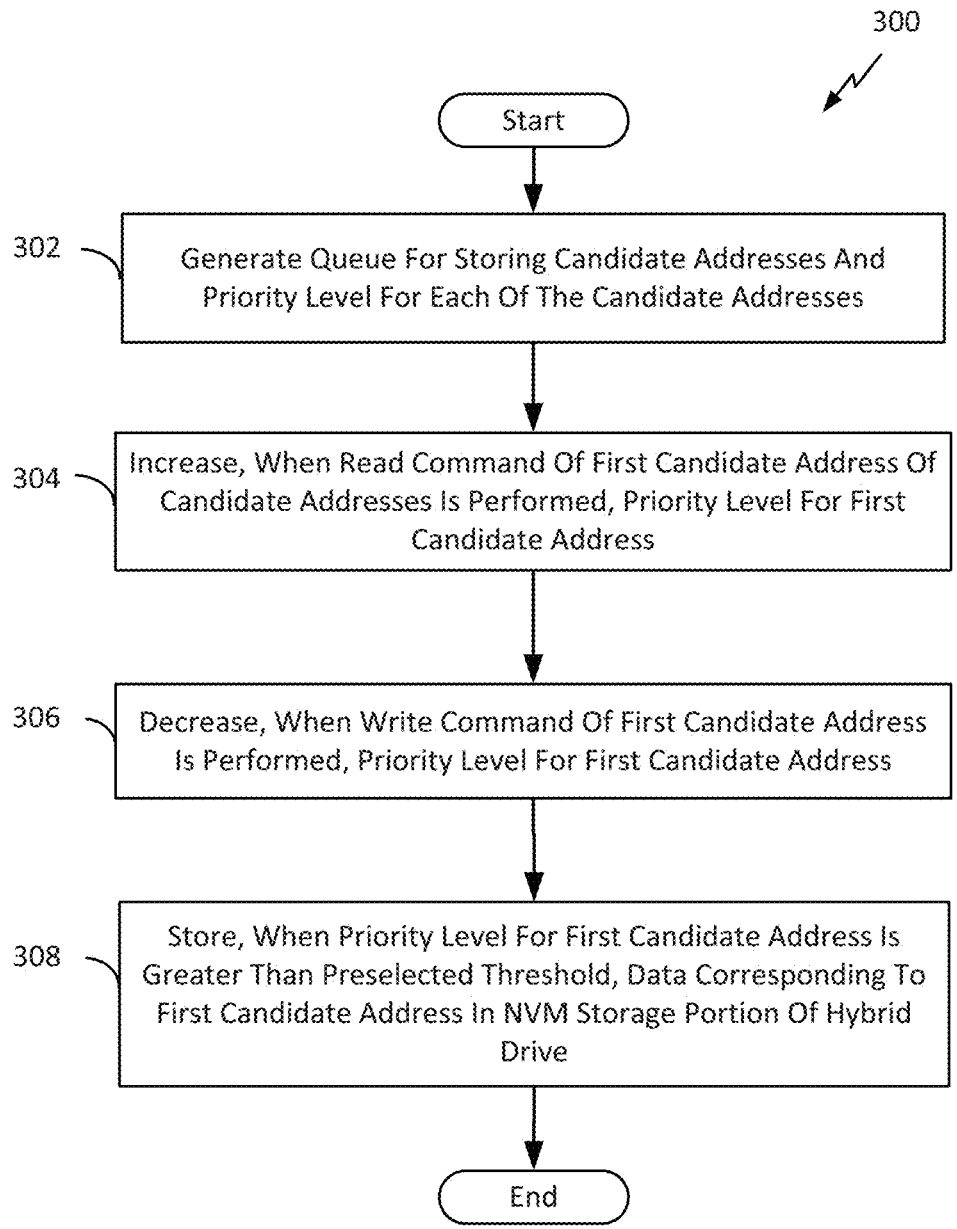
FIG. 3 is a flowchart of a process for determining whether to store data in a non-volatile memory (NVM) storage portion of the hybrid drive of select candidate addresses where write commands decrease a priority level for the candidate addresses in accordance with one embodiment of the disclosure.
Figure 4:
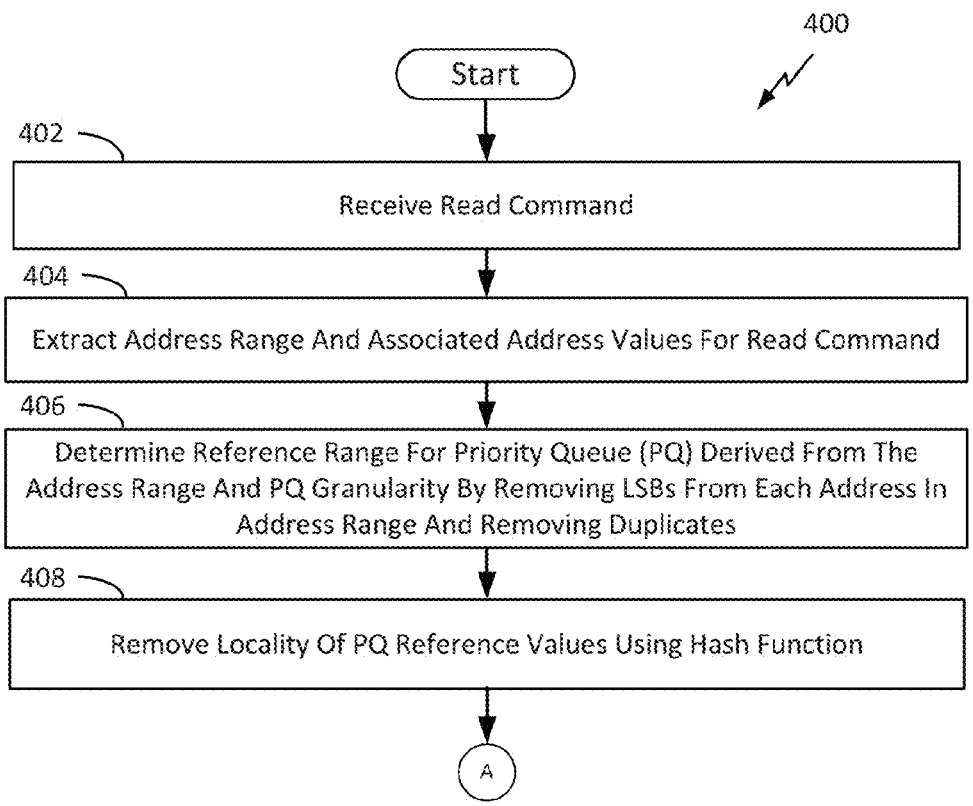
FIGS. 4, 5, 6, and 7 illustrate a flowchart of a specific process for determining whether to store data in a non-volatile memory (NVM) storage portion of the hybrid drive of select candidate addresses associated with a read command in accordance with one embodiment of the disclosure.
Figure 5:
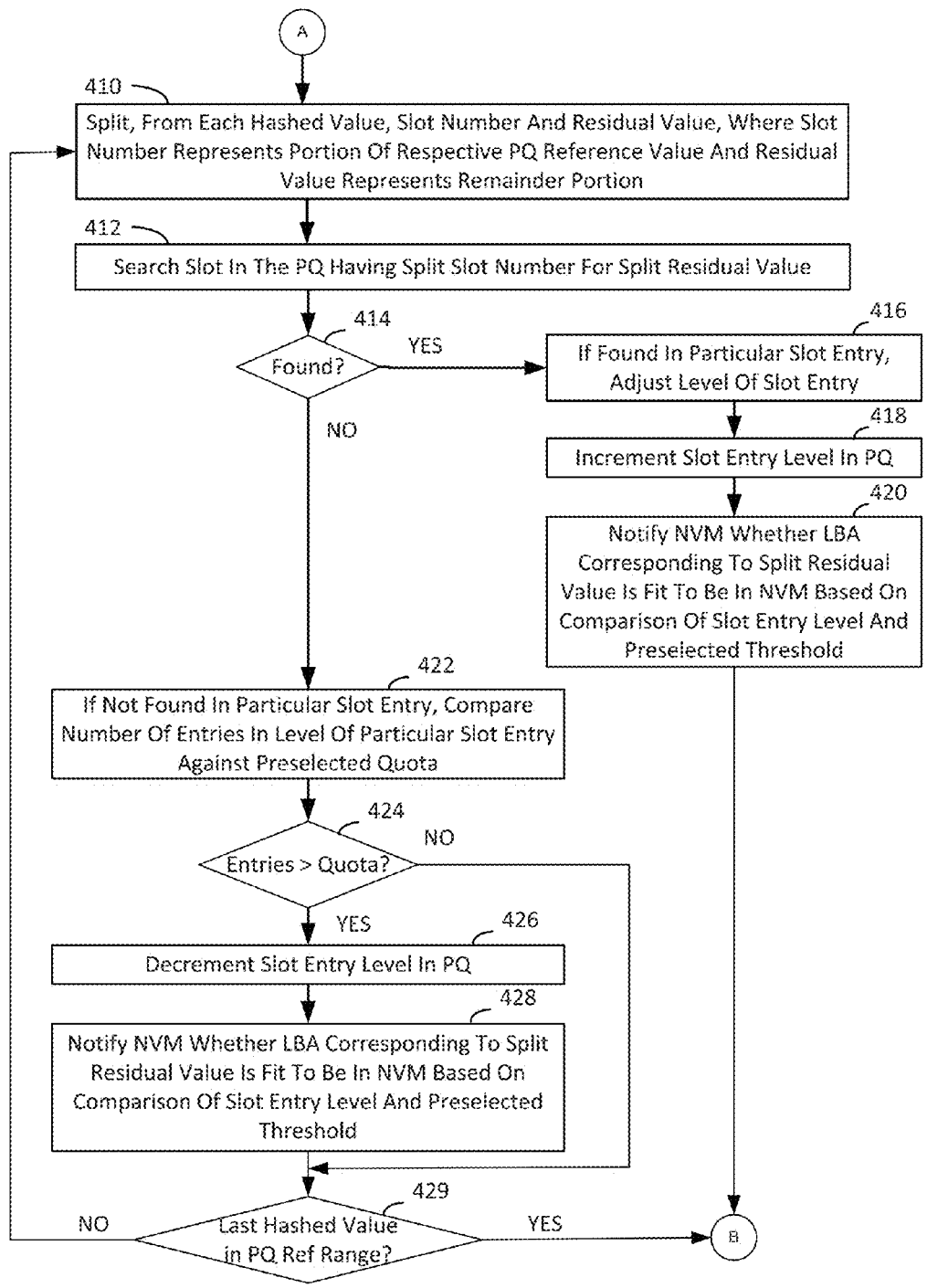
Figure 6:
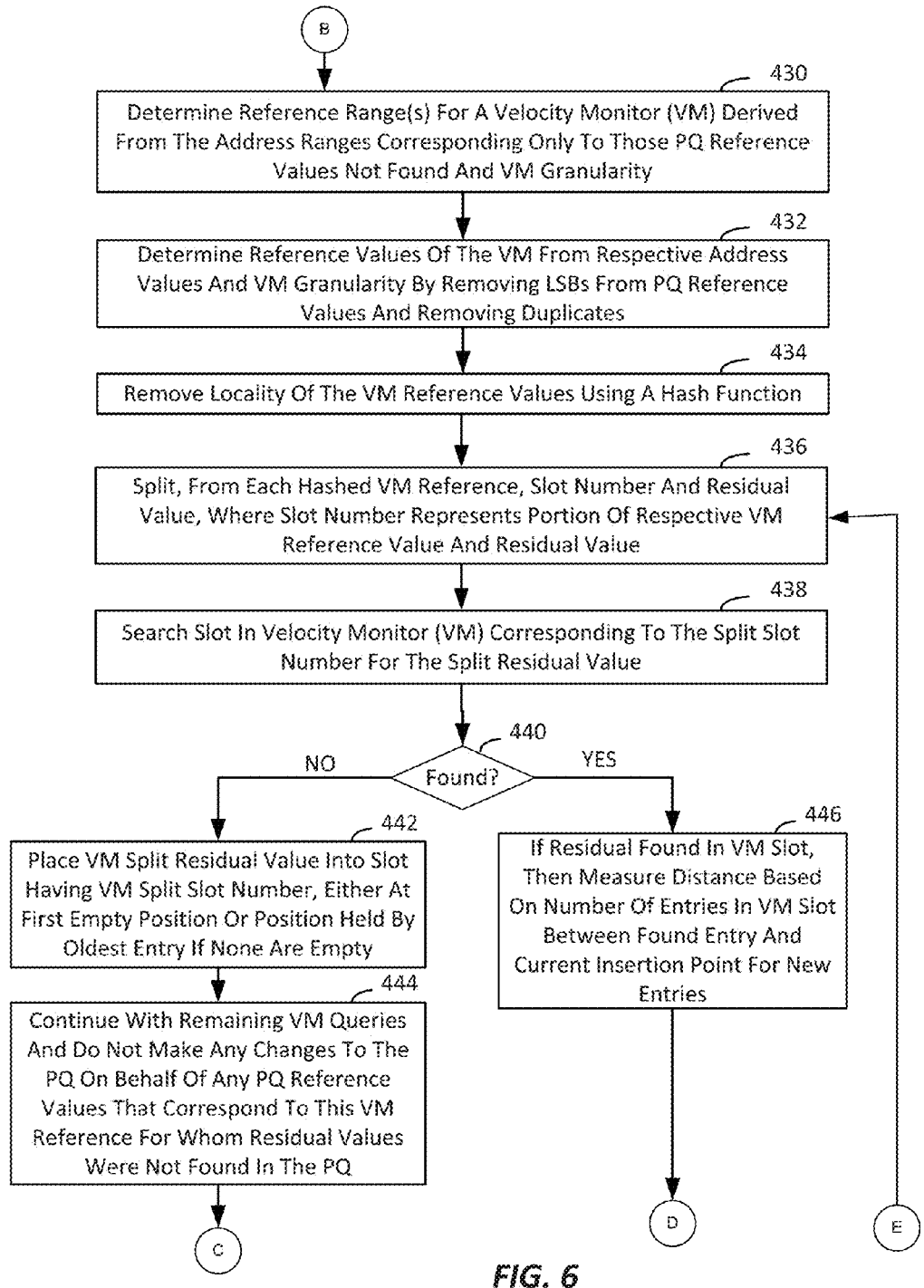
Figure 7:
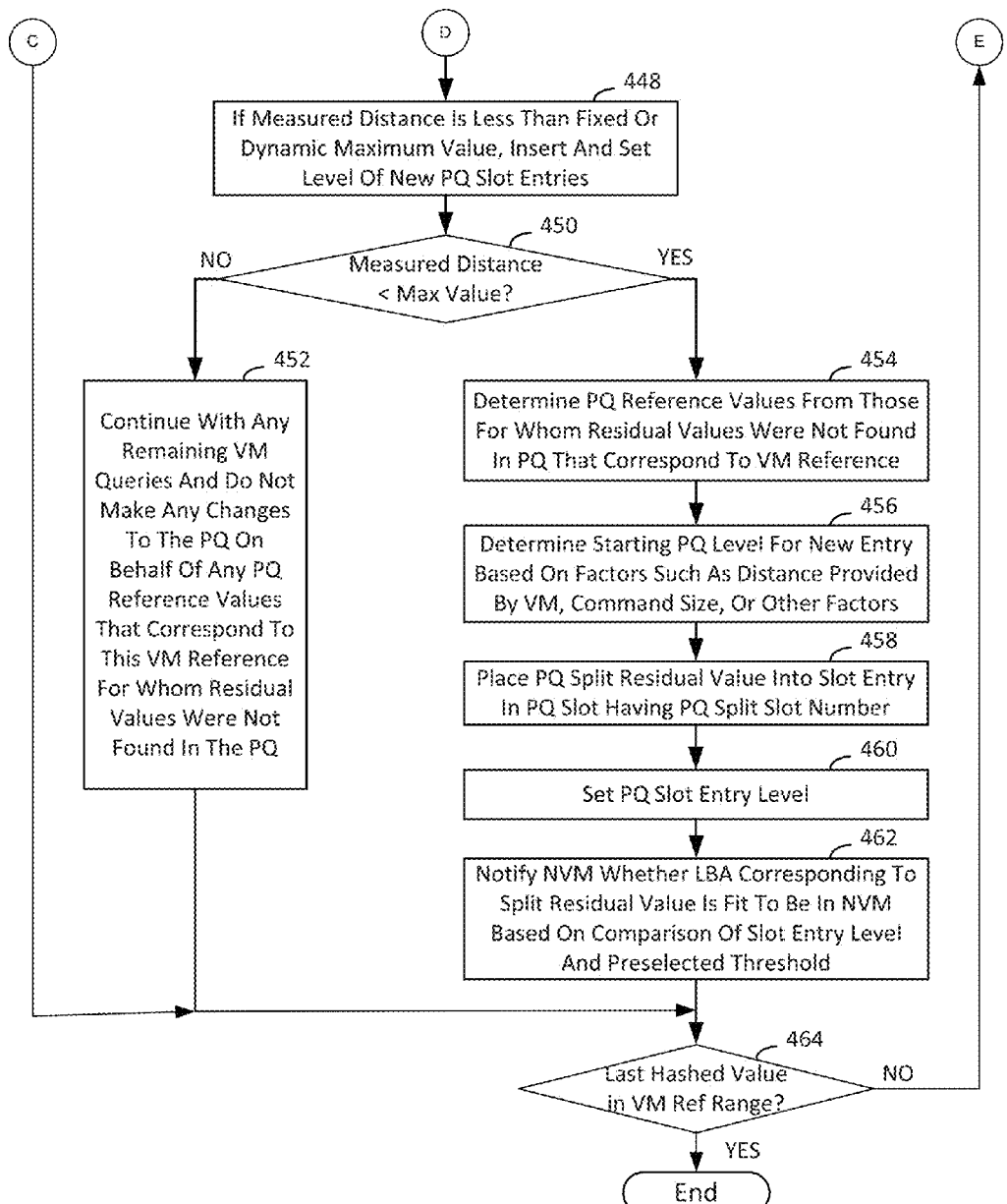

FIG. 3 is a flowchart of a process 300 for determining whether to store data in a non-volatile memory (NVM) storage portion of the hybrid drive of select candidate addresses where write commands decrease a priority level for the candidate addresses in accordance with one embodiment of the disclosure. In one aspect, the process can be performed using the hard disk controller 104 of FIG. 1. In block 302, the process generates a queue for storing a plurality of candidate addresses and a priority level for each of the plurality of candidate addresses. In one aspect, the queue can be referred to as a priority queue (PQ) and can be used to manage and store a priority level for each of the candidate addresses. The candidate addresses can be a collection of addresses (e.g., logical block addresses, LBAs, or portions thereof) being considered for inclusion (e.g., storage) in the NVM portion of the drive. As will be discussed in greater detail below, these candidate addresses can be selected based on preselected activities associated with the addresses, including reads and writes.

In block 304, the process increases, when a read command of a first candidate address of the plurality of candidate addresses is performed, the priority level for the first candidate address.

In block 306, the process decreases, when a write command of the first candidate address is performed, the priority level for the first candidate address.

In block 308, the process stores, when the priority level for the first candidate address is greater than a preselected threshold, data corresponding to the first candidate address in the NVM storage portion of the hybrid drive. In one embodiment, the storing is immediate (e.g., forces data to be read from of disk portion of drive earlier than usual and then stored in the NVM). In another scenario, the storing is delayed (e.g., when data happens to be in RAM may be stored in the NVM). In either case, the storing may or may not include the entire data.

In one embodiment, the read command includes a range of addresses in the disk storage portion of the hybrid drive. In such case, the generating the queue for storing the plurality of candidate addresses and the priority level for each of the plurality of candidate addresses in block 302 may include (1) generating the queue for storing the plurality of candidate addresses and the priority level for each of the plurality of candidate addresses, (2) determining a relative distance between reads of a first address corresponding with a second address within the range of addresses, and (3) storing, when the relative distance is less than a relative distance threshold, a second candidate address, corresponding to the second address, and a respective priority level in the queue.

In several embodiments, the process further includes determining the respective priority level for the second candidate address based on the relative distance. In one such embodiment, the shorter the relative distance that is measured, the higher the corresponding priority level determined by the process.

Figure 14:
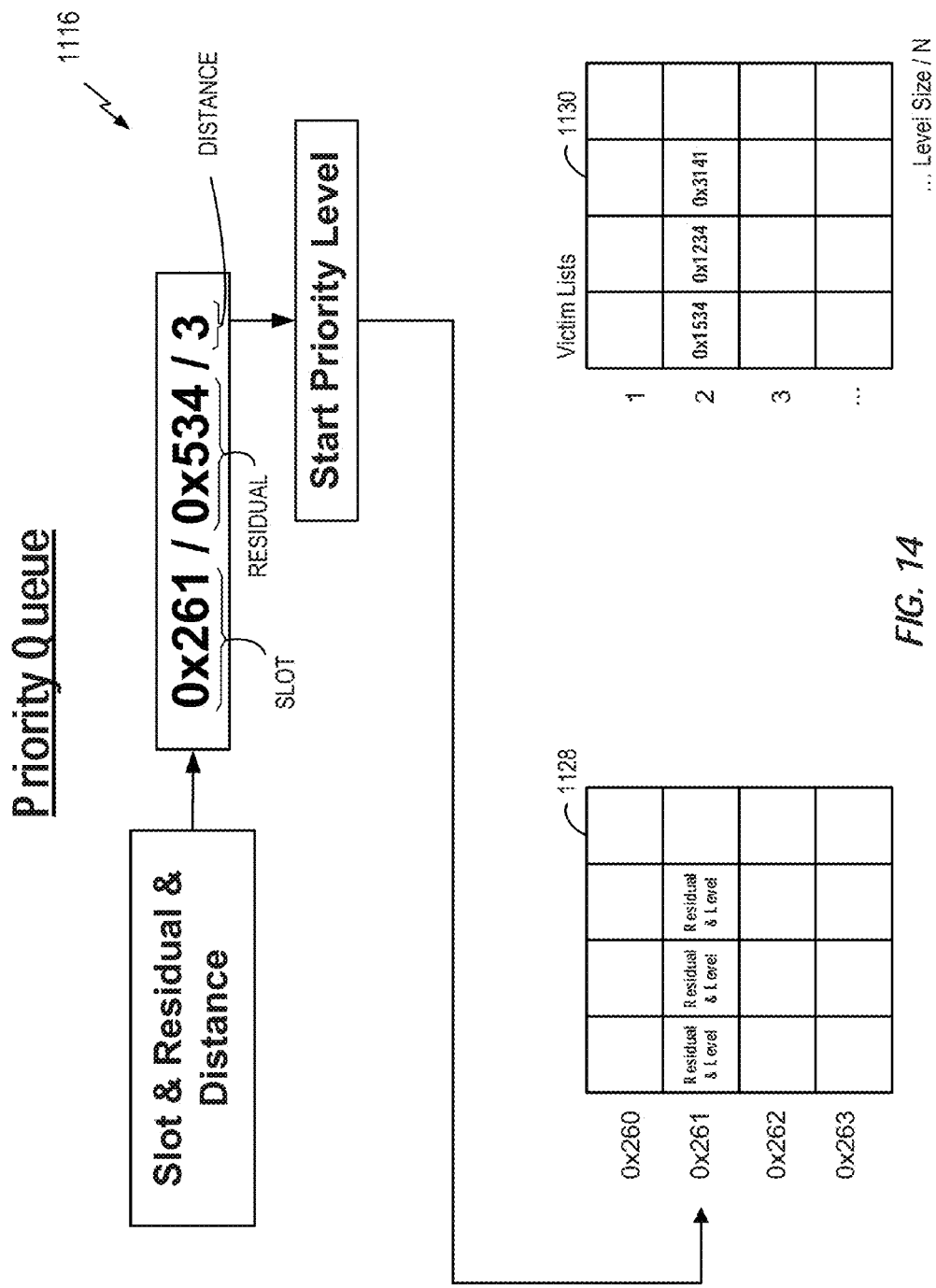
FIG. 14 is a diagram illustrating an example operation of a priority queue (PQ) monitor on a candidate address involving a slot, a residual, a distance, an assigned priority level and a slot table for storing the residual and priority level in accordance with one embodiment of the disclosure.

In one embodiment, the process further includes splitting the first address into a slot value and a residual value, where the queue is implemented using an array having at least one index of slot values, and where the first address is a truncated version of the second address. In such case, the residual value can be stored in the array/queue. This will be discussed in greater detail below and is shown in FIG. 14.

In one embodiment, the process further includes (1) hashing the first address to remove locality (e.g., where locality is a degree of proximity from one address to another), and (2) splitting the hashed first address into a slot value and a residual value. In such case, the queue is implemented using an array having at least one index of slot values, and the first address is a truncated version of the second address. This will be discussed in greater detail below and is shown in FIG. 14.

In several embodiments, the process 300 can include any of the features of process 200 in FIG. 2, including for example, the good samaritan technique, victim list technique, and priority swap technique.

In one aspect, the process can perform the sequence of actions in a different order. In another aspect, the process can skip one or more of the actions. In other aspects, one or more of the actions are performed simultaneously. In some aspects, additional actions can be performed.

FIGS. 4, 5, 6, and 7 illustrate a flowchart 400 of a specific process for determining whether to store data in a non-volatile memory (NVM) storage portion of the hybrid drive of select candidate addresses associated with a read command in accordance with one embodiment of the disclosure. In one aspect, the process can be performed using the hard disk controller 104 of FIG. 1.

In block 402, the process receives a read command. In one embodiment, for example, the read command might specify a base address of 0x1234567 and a number of blocks of 0x10. In block 404, the process extracts an address range and associated address values for the read command. Following the previous example, the process might extract an address range of 0x1234567 to 0x1234576 and each of the address values (0x1234567, 0x1234568, 0x1234569 . . . 0x1234576) within that range. In block 406, the process determines a reference range for a priority queue (PQ) derived from the address range and PQ granularity by removing a preselected number of sequential bits, beginning with the least significant bit (LSB), from each address in the address range. In such case, the process can also remove any duplicates that exist after the LSBs are removed. In one embodiment, the process removes 4 of the LSBs. Following the previous example, the process may remove 4 of the LSBs to obtain a reference range of 0x123456 (e.g., representing 9 blocks) and 0x123457 (e.g., representing 7 blocks), where eight instances of 0x123456 and six instances of 0x123457 are eliminated as being duplicates.

Figure 11:
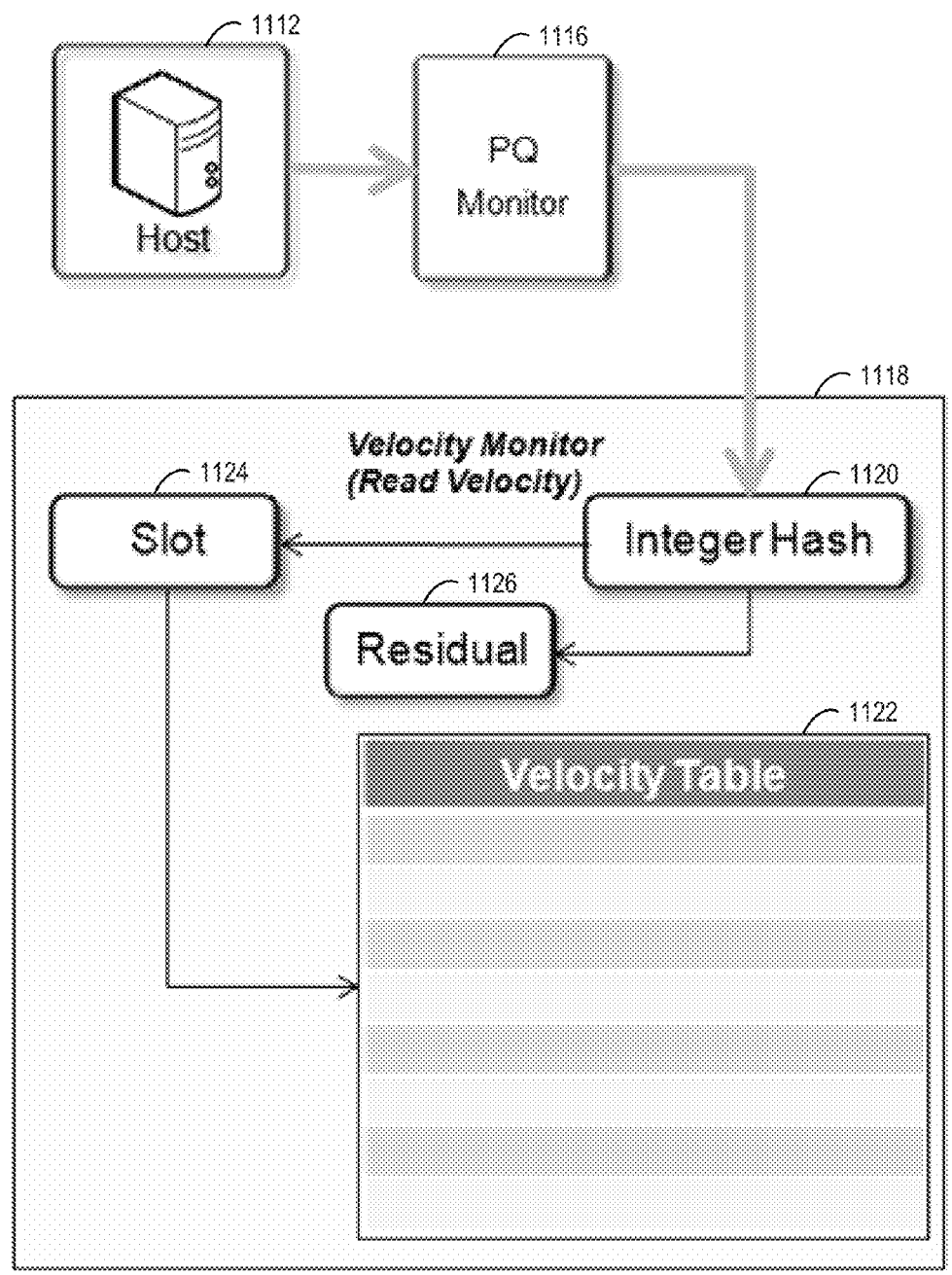
FIG. 11 is a block diagram illustrating a command flow through a hard disk controller with a priority queue (PQ) monitor and a velocity (VM) monitor where the commands are split with a hash function and stored in a table of the VM in accordance with one embodiment of the disclosure.

In block 408, the process removes locality of PQ reference values (e.g., shaved addresses of read command minus duplicates) using a hash function (e.g., an integer hash function). In block 410, the process splits, from each PQ reference value (e.g., in the PQ reference range), a slot number and a residual value, where the slot number represents a portion of the respective PQ reference value and the residual value represents the remainder portion of the respective PQ reference value. A similar step is illustrated in FIG. 11 for a velocity monitor (VM).

In blocks 412 and 414, the process searches a slot in the PQ (e.g., PQ table for storing candidate addresses by slot and residual values) having the split slot number for the split residual value. In block 416, if the split residual is found in a particular slot entry of the PQ, then the process adjusts a priority level of the slot entry. FIG. 14 shows a PQ and associated slot and residual values. FIG. 14 will be discussed in greater detail below. In block 418, for example, the process increments the priority level of the particular slot entry level in the PQ. In block 420, the process notifies a NVM whether a logical block address (LBA) corresponding to the split residual value is fit to be in the NVM based on a comparison of the slot entry level and a preselected threshold.

In some embodiments, the process keeps a count of the number of addresses fit to be in the NVM and considers the data in aggregate once all addresses/residuals have been searched. For example, the process (e.g., controller) may aggregate the scalar fitnesses (e.g., position between minimum "fit" level and maximum level) of the various PQ reference values to provide a recommendation for the command as a whole. The aggregator could be any desired function, ranging from "all fit→command fit" to "any fit→ command fit" or perhaps averaging the percent that each block is from minimum to maximum fitness and considering the command fit if that average is over 50%. Since the fitness updates and aggregation could take time, the controller may calculate and store this aggregate when the read notify occurs, provide the aggregate as a query after the data has been read from the magnetic storage, or utilize a caching scheme to mix the two options. Once the data has been read, the controller may command the NVM to store the data, however the NVM could disregard this command if unable due to resource constraints.

In block 422, if the residual is not found in a particular slot (e.g., in block 414), the process can compare the number of entries for the particular slot against a preselected quota/threshold. In block 424 and 426, if the number of entries is greater than the quota, the process decrements the slot entry level in the PQ. If the number of entries is not greater than the quota, the process continues to block 429 which will be discussed in greater detail below. In block 428, the process notifies the NVM whether a logical block address (LBA) corresponding to the split residual value is fit to be in the NVM based on a comparison of the slot entry level and a preselected threshold. In some embodiments, the process keeps a count of the number of addresses fit to be in the NVM, or removed there from, and considers the data in aggregate once all addresses/residuals have been searched.

In block 429, the process determines whether it has reached the last hashed value in the PQ reference range. If not, the process returns to block 410 and continues with processing another hashed value in the PQ reference range. If so, the process continues to block 430.

Figure 13:
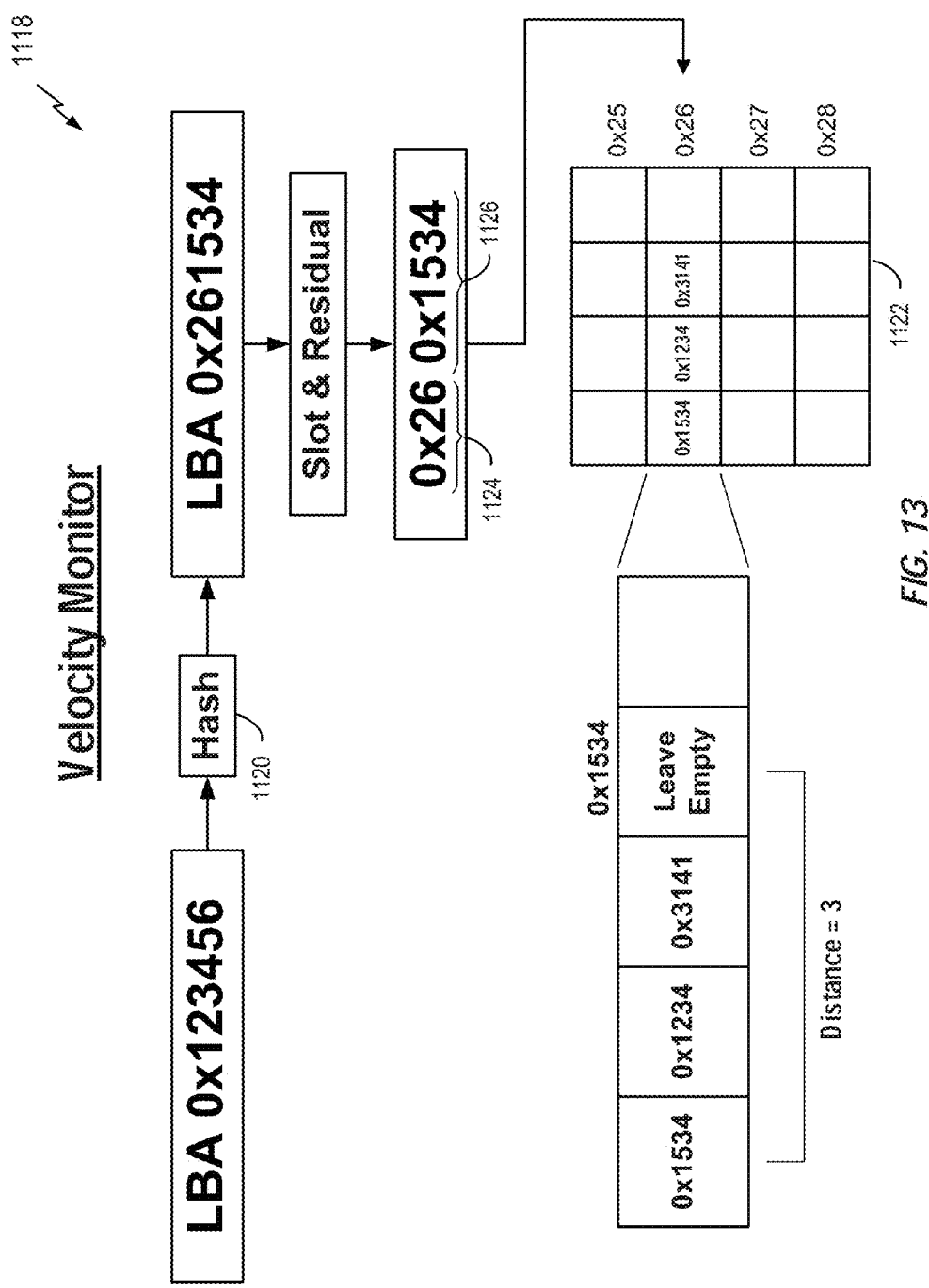
FIG. 13 is a diagram illustrating an example operation of a velocity (VM) monitor on a candidate address involving a hash function, a table, and a circular buffer for a slot in the table in accordance with one embodiment of the disclosure.

In block 430, the process determines reference range(s) for a velocity monitor (VM) derived from the address ranges corresponding only to those reference values not previously found in the PQ table and VM granularity. In block 432, the process determines reference values of the VM from respective address values and VM granularity by removing a preselected number of sequential LSBs from each PQ reference value and removing any duplicates. In block 434, the process removes locality of the VM reference values using a hash function, where locality is a degree of proximity from one VM reference value to another. In block 436, the process splits, from each VM reference, a slot number and a residual value, where the slot number represents a portion of the respective VM reference value and the residual value represents the remainder portion of the respective VM reference value. FIG. 13 shows an example of an address operated on by a velocity monitor function including use of a hash function and the splitting of the hashed address into a slot and residual. FIG. 13 will be discussed in greater detail below.

It is useful to consider an example of the actions of the process in blocks 430 to 436. For example, given PQ shaving four bits and VM shaving an additional two bits and an address range beginning at address 0x1234567 with 160 blocks, thus ending at 0x1234607, relating in the PQ only to a PQ entry corresponding to the range 0x1234590 . . . 0x123459F (one out of four PQ entries corresponding to one VM entry) and four PQ entries corresponding to the range 0x12345C0 . . . 0x12345FF (all four of four PQ entries corresponding to the one VM entry immediately following the one mentioned on the previous range), the process in block 430 would begin with PQ shaved values 0x 123456 . . . 0x123458, 0x12345A, 0x12345B, and 0x123460. In such case, the process in block 432 removes two LSBs from these values, resulting in values of 0x48D15, 0x48D15, 0x48D16, 0x48D16, 0x48D16, and 0x48D18 (0x48D17 is absent due to the PQ entries found corresponding to its entire range), and removes duplicates to yield values of 0x48D15, 0x48D16, and 0x48D18. In such case, the process in block 434 then hashes these values yielding, for a poor hash function, 0x51D840, 0x61D840, and 0x81D840. The process in block 436, assuming a twelve bit residual, then splits into slots 0x51D, 0x61D, and 0x81D and respective residuals 840, 840, and 840.

Figure 12:
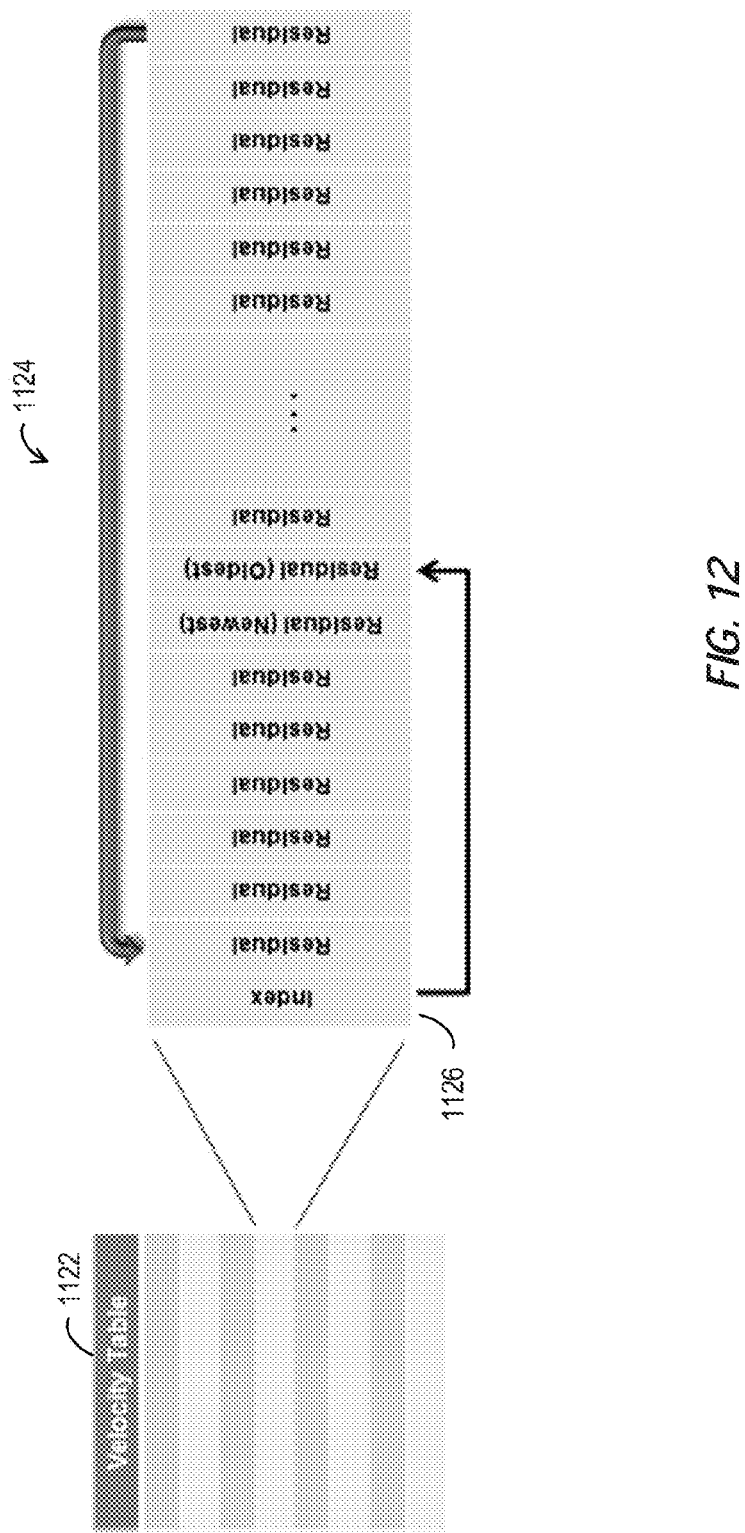
FIG. 12 is a diagram illustrating a table of a velocity (VM) monitor and a data structure arrangement for a slot in the VM table in accordance with one embodiment of the disclosure.

In blocks 438 and 440, the process searches a slot in the velocity monitor (VM) corresponding to the split slot number for the split residual value. In block 442, if the split residual is not found in the slot, the process places the VM split residual into a slot entry having the VM split slot number (e.g., either at the first empty position or position held by oldest entry if none are empty). FIG. 12 illustrates a velocity monitor (VM) and a data structure arrangement for a slot in the VM table. FIG. 12 will be discussed in greater detail below. In block 444, the process may continue with remaining VM queries in block 464 without making changes to the PQ on behalf of any PQ reference values that correspond to this VM reference for whom residual values were not found in the PQ. Block 464 will be discussed in greater detail below.

In block 446, if the residual is found in a VM slot (e.g., in block 440), the process measures a distance based on the number of entries in the VM slot between the found occurrence and the current insertion point for new entries (see for example relative distance of 3 in FIG. 13). In blocks 448 and 450, the process determines if the measured distance is less than a fixed or a dynamic maximum value, and may then insert and set a level of new PQ slot entries. In block 452, if the measured distance is not less than the maximum value, then the process continues with any remaining VM queries in block 464 and may not make any changes to the PQ on behalf of any PQ reference values that correspond to this VM reference for whom residual values were not found in the PQ. Block 464 will be discussed in greater detail below.

In block 454, the process determines the PQ reference values from those for whom residual values were not found in the PQ that correspond to this VM reference. In block 456, the process determines a starting PQ level for this new entry based on factors such as distance provided by the VM, command size, or other factors (e.g., such as the degree of empty storage capacity in the NVM, the degree of wear in the NVM, the degree of current NVM performance, etc.). In block 458, the process places the PQ split residual value into a slot entry in the slot in the PQ having the PQ split slot number, either at an empty entry or one of the lesser levels if none are empty. In block 460, the process sets the slot entry level in PQ. The slot entry levels can be set in accordance with desired shaped level sizes as discussed below in the description of FIG. 18. In block 462, the process notifies a NVM whether a logical block address corresponding to the split residual value is fit to be in the NVM based on a comparison of the slot entry level and a preselected threshold. Following block 462, the process continues to block 464.

In block 464, the process determines whether it has reached the last hashed value in the VM reference range. If not, the process returns to block 436 and continues with processing another hashed value in the VM reference range. If so, the process may end.

Figure 8:
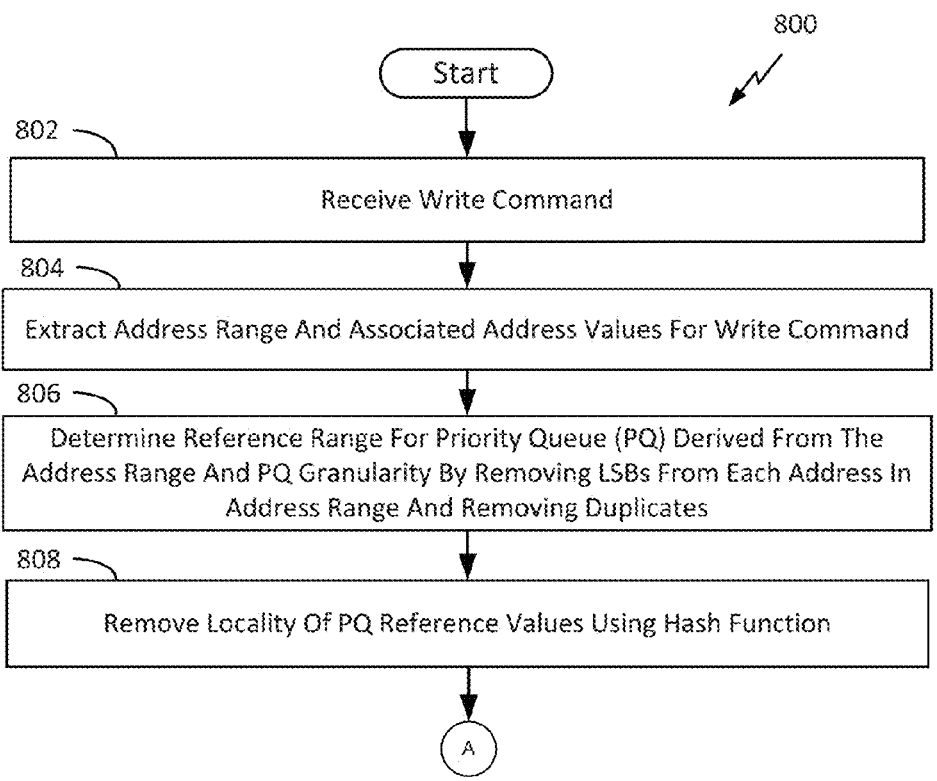
FIGS. 8 and 9 illustrate a flowchart of a specific process for determining whether to store data in a non-volatile memory (NVM) storage portion of the hybrid drive of select candidate addresses associated with a write command in accordance with one embodiment of the disclosure.
Figure 9:
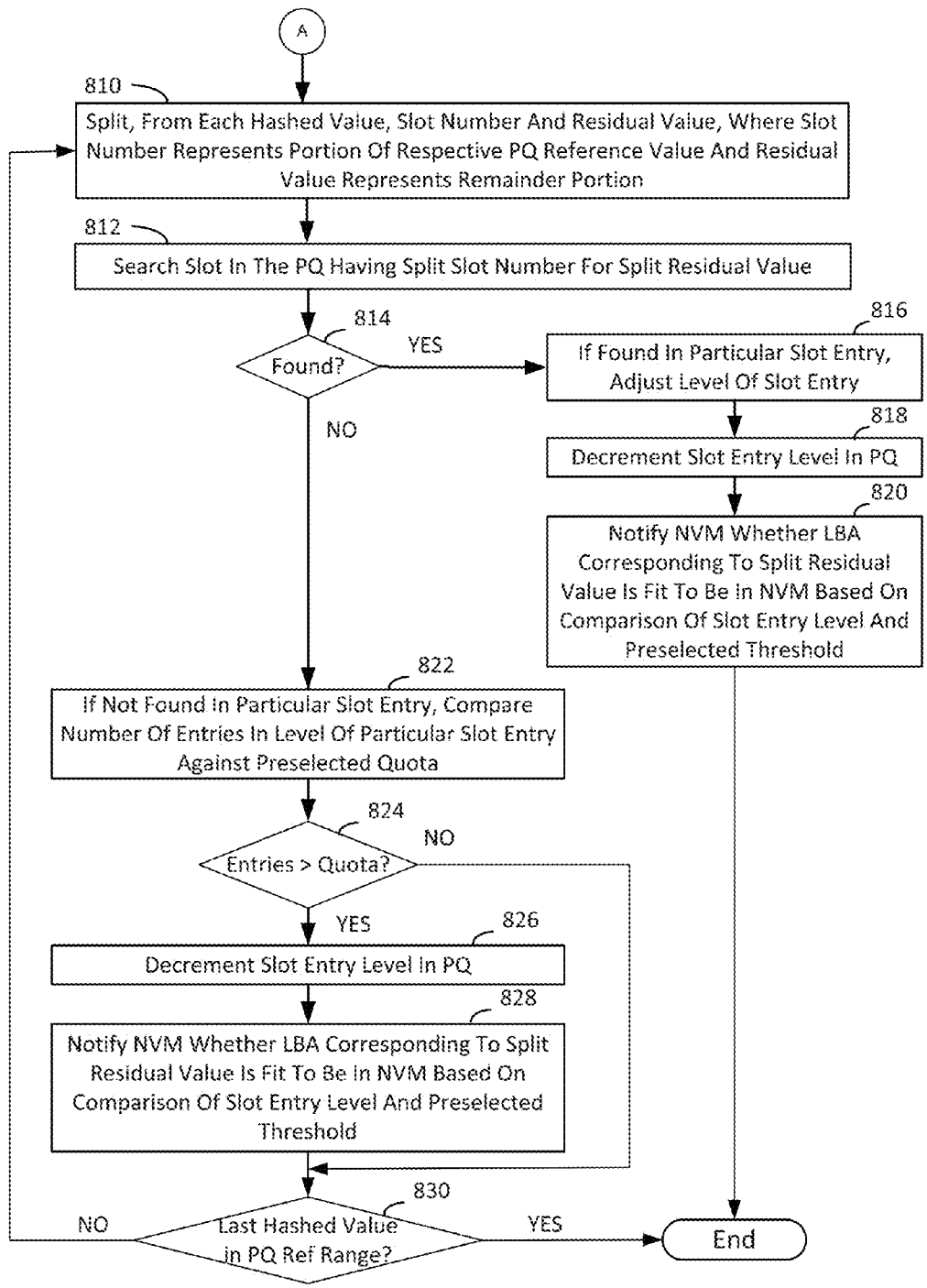

FIGS. 8 and 9 illustrate a flowchart of a specific process 800 for determining whether to store data in a non-volatile memory (NVM) storage portion of the hybrid drive of select candidate addresses associated with a write command in accordance with one embodiment of the disclosure. In one aspect, the process can be performed using the hard disk controller 104 of FIG. 1.

In block 802, the process receives a write command. In block 804, the process extracts an address range and associated address values for the write command. In block 806, the process determines a reference range for a priority queue (PQ) derived from the address range and PQ granularity by removing a preselected number of sequential bits, beginning with the LSB, from each address in the address range. In such case, the process can also remove any duplicates that exist after the LSBs are removed. In one embodiment, the process removes 4 of the LSBs. In block 808, the process removes locality of PQ reference values using a hash function (e.g., an integer hash function). In block 810, the process splits, from each PQ reference value (e.g., in the PQ reference range), a slot number and a residual value, where the slot number represents a portion of the respective PQ reference value and the residual value represents the remainder portion of the respective PQ reference value. In one embodiment, example values for the process in blocks 802 to 810 can be similar to those discussed above.

In blocks 812 and 814, the process searches a slot in the PQ (e.g., PQ table) having the split slot number for the split residual value. In block 816, if the split residual is found in a particular slot entry of the PQ, the process adjusts a priority level of the slot entry. In block 818, for example, the process decrements the priority level of the particular slot entry level in the PQ. In block 820, the process notifies a NVM whether a logical block address (LBA) corresponding to the split residual value is fit to be in the NVM based on a comparison of the slot entry level and a preselected threshold. In some embodiments, the process keeps a count of the number of addresses fit to be in the NVM and considers the data in aggregate once all addresses/residuals have been searched. After block 820, the process proceeds to block 830 which is discussed in greater detail below.

In block 822, if the residual is not found in a particular slot (e.g., in block 814), the process can compare the number of entries for the particular slot against a preselected quota/threshold. In block 824 and 826, if the number of entries is greater than the quota, the process decrements the slot entry level in the PQ. In block 828, the process notifies the NVM whether a logical block address (LBA) corresponding to the split residual value is fit to be in the NVM based on a comparison of the slot entry level and a preselected threshold. In some embodiments, the process keeps a count of the number of addresses fit to be in the NVM and considers the data in aggregate once all addresses/residuals have been searched. After block 828, the process proceeds to block 830.

In block 830, the process determines whether it has reached the last hashed value in the PQ reference range. If not, the process returns to block 810 and continues with processing another hashed value in the PQ reference range. If so, the process may end.

Figure 10:
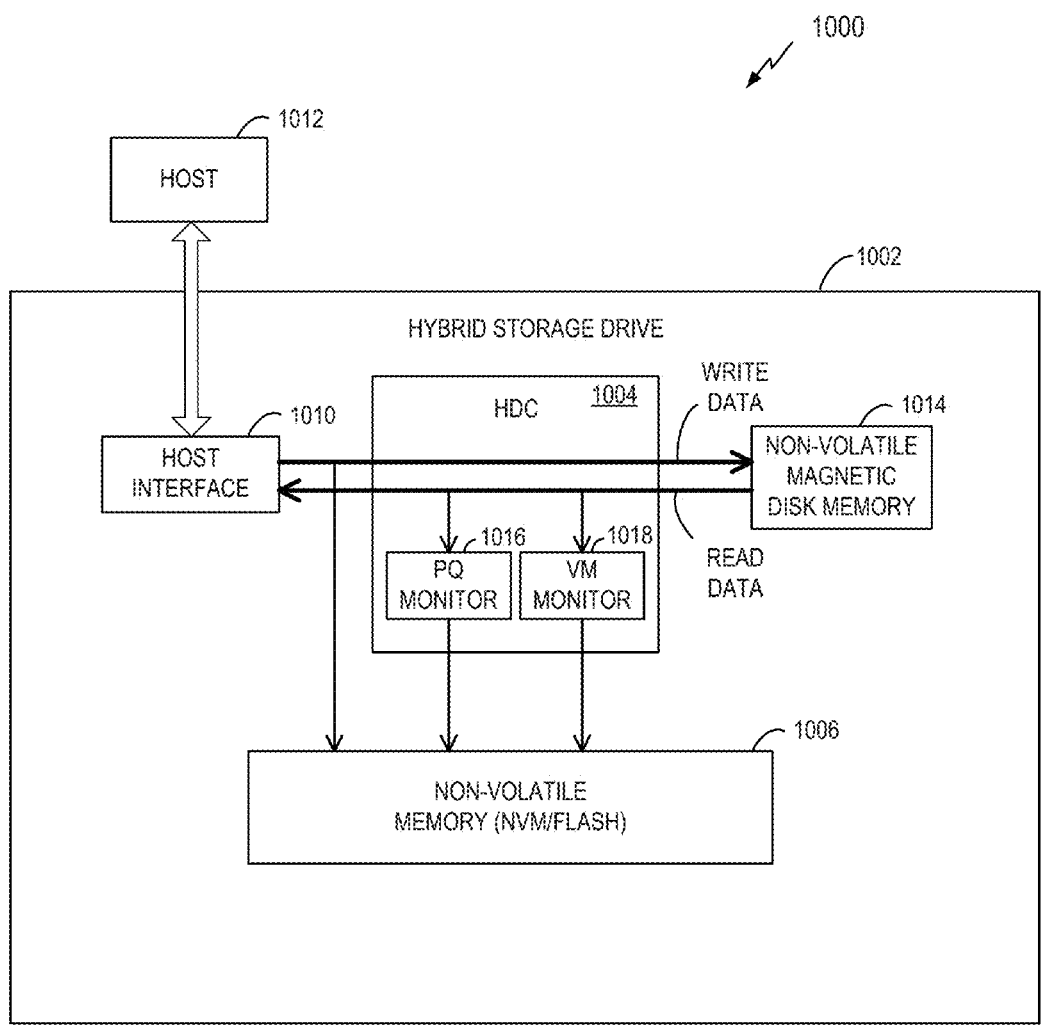
FIG. 10 is a block diagram of a hybrid drive including a hard disk controller with a priority queue (PQ) monitor and a velocity (VM) monitor for determining whether to store data in a non-volatile memory (NVM) storage portion of the hybrid drive of select candidate addresses in accordance with one embodiment of the disclosure.

FIG. 10 is a block diagram of a storage system 1000 including a hybrid drive 1002 with a hard disk controller (HDC) 1004 with a priority queue (PQ) monitor (1016 and a velocity (VM) monitor 1018 for determining whether to store data in a non-volatile memory (NVM) storage portion 1006 of the hybrid drive of select candidate addresses in accordance with one embodiment of the disclosure. The system 1000 further includes a host interface 1010 connected to a host 1012 (e.g., computer such as a personal or portable computer). The hybrid drive 1002 further includes a non-volatile magnetic disk memory 1014.

In operation, the host 1012 issues read commands and write commands involving write data and read data that are directed by the HDC 1004 to the disk memory 1014. The PQ monitor (e.g., fine filter) 1016 and VM monitor (e.g., coarse filter) 1018 can monitor these commands and make recommendations to the NVM 1006 as to which data at select addresses should also be stored in the NVM. Aspects of the functions performed by the PQ monitor and VM monitor are described above in the descriptions of FIGS. 2-9. Further details about the PQ monitor and VM monitor are described below.

In one aspect, the hybrid drive 1002 can include other components such as those depicted in the hybrid drive 102 of FIG. 1. In one aspect, the components of the system 1000 can operate similar to the manner described above for the corresponding components of FIG. 1.

FIG. 11 is a block diagram illustrating a command flow 1101 through a hard disk controller with a priority queue (PQ) monitor 1116 and a velocity (VM) monitor 1118 where the commands are split with a hash function 1120 (e.g., integer hash function) and stored in a table (e.g., VM or Velocity table) 1122 of the VM in accordance with one embodiment of the disclosure. The hash function 1120 splits the incoming command(s) (e.g., read command or write command) into a slot value 1124 and a residual value 1126. Each slot of the VM table 1122 can include any number of entries for storing residual values as shown in FIG. 12. FIG. 13 illustrates an example of the split operation and storage of a residual value. An incoming command (e.g., read or write) involves an address of LBA "0x123456". The hash function splits the command address into a slot value of "0x26" and a residual of "0x1534". The slot value of "0x26" corresponds to a slot in the VM table which includes multiple entries.

FIG. 12 is a diagram illustrating the VM table 1122 and a data structure arrangement for a slot in the VM table in accordance with one embodiment of the disclosure. The data structure is a circular buffer 1124 of the residual values, though other data structures may also be used. Each slot may contain the last N updates that can be used as the basis for calculating read frequency. The circular buffer 1124 includes an index 1126 that points to the oldest residual and location of the next residual to be written into the buffer.

In one aspect, when they are updated, the residuals may be searched in newest to oldest order. If a residual match is found, the associated read LBAs are either added to the PQ monitor, and potentially written to the NVM, or the residual value is added to the entry.

In one aspect, it is noted that the frequency determination can be considered a local rather than a global frequency comparison. In one aspect, it is further noted that increasing the number of residuals per slot may improve the reliability of the relative distance estimate.

FIG. 13 is a diagram illustrating an example operation of a velocity (VM) monitor on a candidate address involving a hash function, a table, and a circular buffer for a slot in the table in accordance with one embodiment of the disclosure. FIG. 13 also illustrates the determination of a relative distance between reads of the candidate address (e.g., distance between storage positions of identical residual values). In the example, the residual of "0x1534" is to be placed in the slot entry marked "Leave Empty" and is thus a distance (e.g., relative distance) of 3 from a prior occurrence of the same residual of "0x1534".

FIG. 14 is a diagram illustrating an example operation of a priority queue (PQ) monitor on a candidate address (e.g., LBA of "0x261534") involving a slot ("0x261"), a residual ("0x534"), a distance ("3"), an assigned priority level and a PQ (e.g., PQ slot table) 1128 for storing the residual and priority level in accordance with one embodiment of the disclosure. The PQ monitor can also include a victim list table 1130 for tracking random victims of the candidate addresses to be demoted in the PQ table. As discussed above, the process or PQ may employ a victim list technique for maintaining a fitness of candidate addresses in the queue. In such case, the process may include (1) maintaining a count of entries in the queue at each priority level, (2) maintaining a list of candidate addresses for each priority level, (3) determining whether the count of entries of a first priority level in the plurality of priority levels is greater than a priority level threshold, (4) selecting, if the count of entries of the first priority level is greater than the priority level threshold, a victim from the list of candidate addresses at the first priority level, and (5) decreasing, if the count of entries of the first priority level is greater than the priority level threshold, a priority level of the entry in the queue corresponding to the victim.

Figure 15:
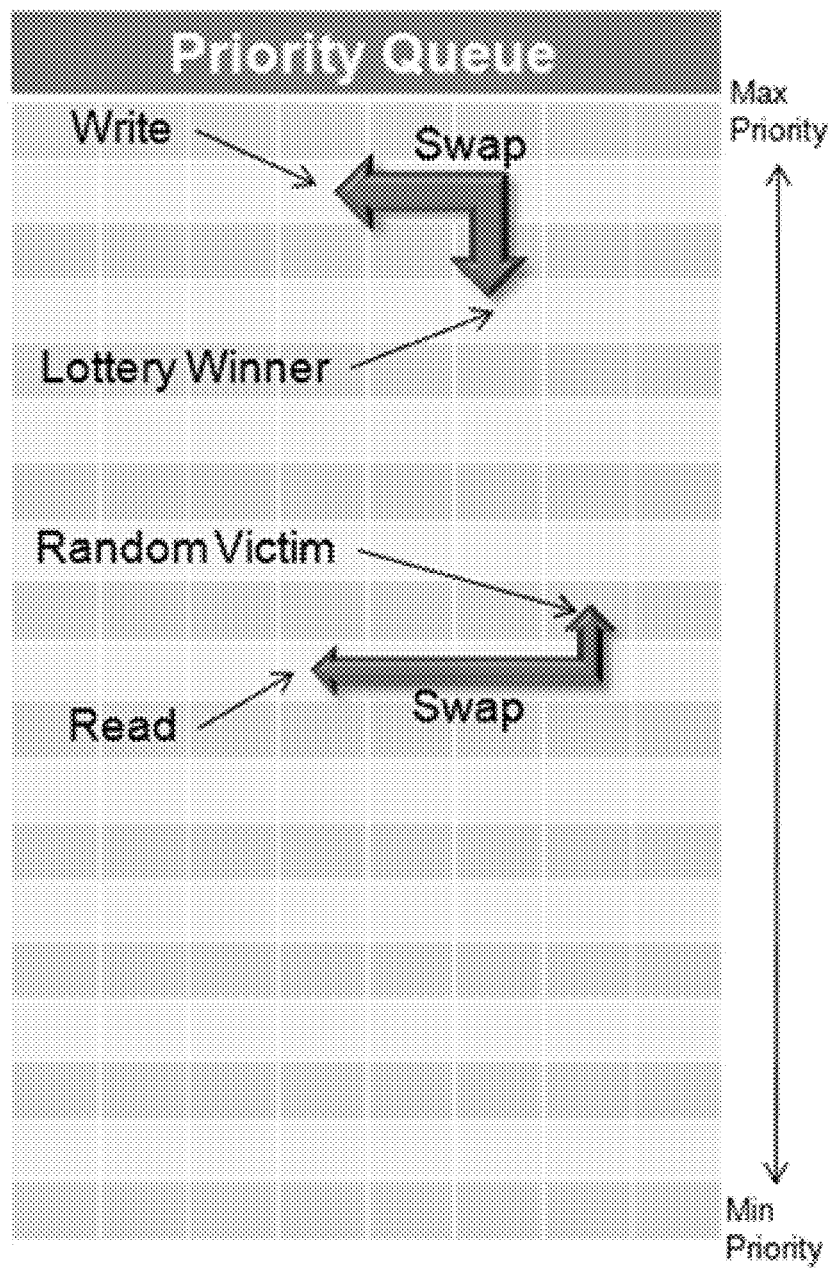
FIG. 15 is a diagram illustrating an example operation of a priority queue (PQ) monitor in accordance with one embodiment of the disclosure.

FIG. 15 is a diagram illustrating an example operation of a priority queue (PQ) monitor in accordance with one embodiment of the disclosure. In one aspect, instead of explicitly tracking reads and writes, the PQ monitor maintains priority queues of candidate LBA ranges. The priority queue can be populated from a Velocity Monitor (VM) at a priority based on delta count (e.g., relative distance) in slot. In one aspect, the priority level may be high frequency enough for immediate NVM write. In one aspect, the priority queue structure allows for closer alignment with ribbon management in the NVM and the priority management technique is simpler than dynamic fitness calculations.

In one aspect, candidate addresses effectively compete for inclusion in the NVM (e.g., NAND), with each read increasing priority and each write decreasing it. In one aspect, the probability of promotion is scaled by transfer length (e.g., where preference may be given to small reads as opposed to large ones). In one aspect, writes (e.g., write commands) may cause a larger scale demotion than read (e.g., read command) promotion and may be scaled by NVM endurance. In one aspect, the priority queue may implement implicit aging for formerly hot reads where, for example, promotions are achieved by swapping priorities with a random victim in a higher tier as shown in the PQ table 1128.

In one aspect, swapping priorities with a random victim in a higher tier may involve the victim list described above. In such case, an upwardly moving entry (e.g., via one or more of the processes described above) would pick a victim from the victim list row for the level it is moving to, derive the slot and residual for that victim from the victim list entry, and set the priority at that residual in that slot to the priority level the upwardly moving entry is moving from. The priority level for the upwardly moving entry is then set to the level the victim was taken from.

Another way that implicit aging may be accomplished is through the good samaritan technique described above (e.g., demoting entries in over-capacity levels when stumbled upon, resulting in any given cold entry being occasionally demoted thereby causing it to be aged out where reads to that entry may provide equal or greater promotion preventing it from being aged out).

Figure 16:
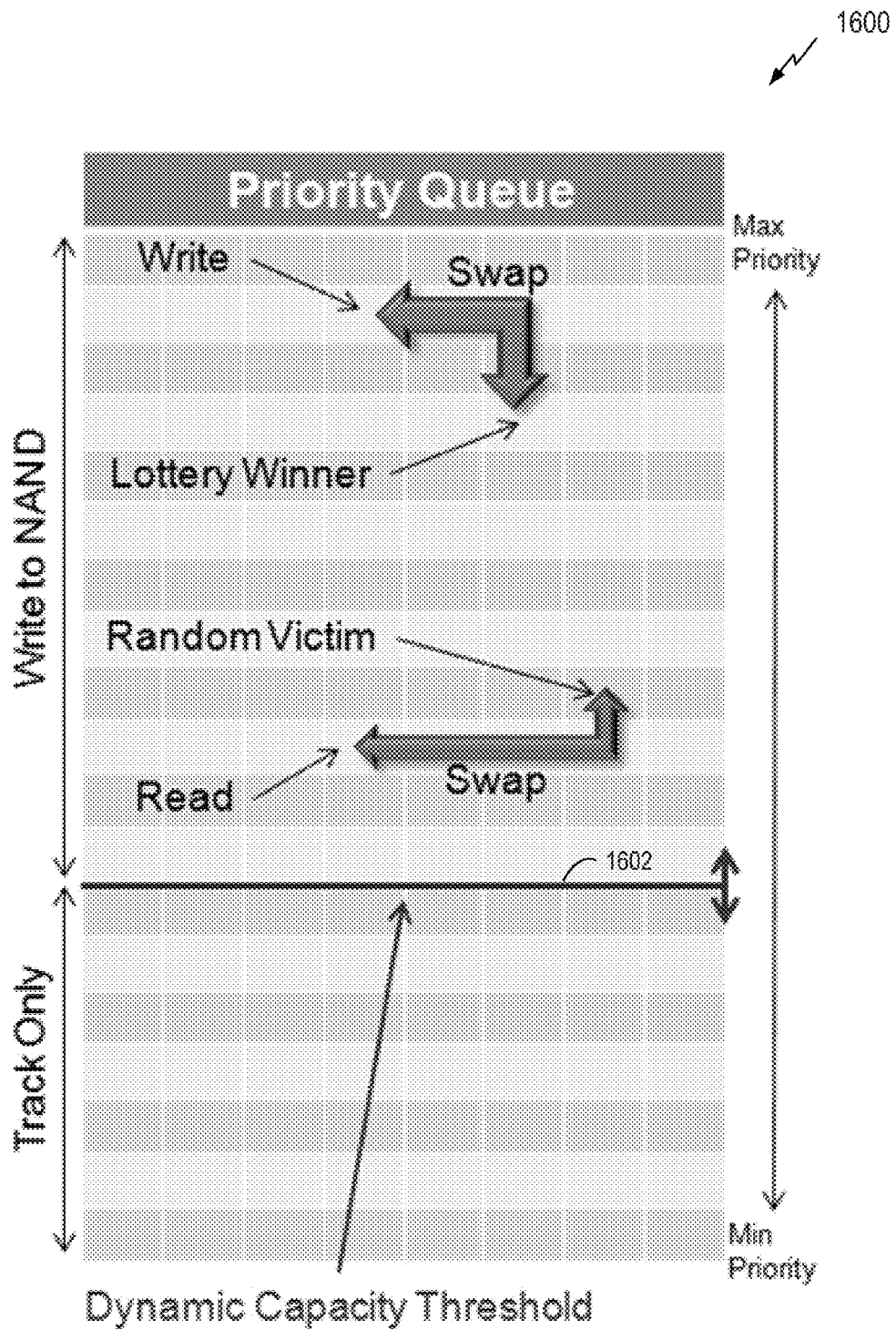
FIG. 16 is a diagram illustrating an example operation of a priority queue (PQ) monitor with a threshold priority level for deciding NVM inclusion in accordance with one embodiment of the disclosure.

FIG. 16 is a diagram illustrating an example operation of a priority queue (PQ) monitor 1600 with a threshold priority level (e.g., dynamic capacity threshold or DCT) 1602 for deciding NVM inclusion in accordance with one embodiment of the disclosure. The Dynamic Capacity Threshold (DCT) can define the NVM inclusion boundary. In one aspect, the DCT attempts to maintain the current available capacity above the threshold/threshold. In one aspect, the DCT represents what remains after LBA access hits. In one aspect, the DCT is scaled for validity to control write amplification.

In one aspect, the DCT maintains the current usable NVM capacity, consisting of any used and unused portions of that capacity. So if there are N levels of M entries above the DCT, there may be N*M entries above the DCT, each corresponding to (on average) Q blocks in the NVM (Q being variable due to PQ granularity). Initially, there may be N*M unused entries above the DCT (because no drive activity has occurred yet), and thus the space above the DCT may correspond to the available unused space in the NVM. After the PQ has fully populated the above-DCT entries, there are N*M used entries above the DCT and thus the space above the DCT may correspond to the used space in the NVM. Swaps and other promotions and demotions may move new entries into this above-DCT space while removing existing entries enabling turnover in the NVM. There may be no advantage to removing entries from the NVM without having something to replace them, with a possible exception of NVM content corresponding the prior state of disk content that has since changed.

In one aspect, when a range (e.g., candidate address range) crosses above the DCT due to promotion or DCT movement it may be written to the NVM (if needed) during idle or after the next read from disk. In one aspect, the range must still be above DCT at the time of a NVM write for NVM inclusion. In one aspect, the NVM-present ranges notify ribbon. The processes described herein are generally unaware of ribbons but may inform the NVM of entries moving in and out of fitness so that the NVM can reclaim space in whatever manner it does. In the case of an NVM employing ribbons, the ribbons containing the data moving in and out of fitness can have their fitness/validity counters incremented or decremented as appropriate.

In one aspect, when a range crosses below the DCT, the ribbon fitness/validity will be reduced. However, the range may still take NVM hits until it is rewritten in the NVM. In one aspect, the range is not rewritten only if still below DCT. For example, in one aspect, the range may not be retained in the NVM through defrag operations if it is below the DCT.

Figure 17:
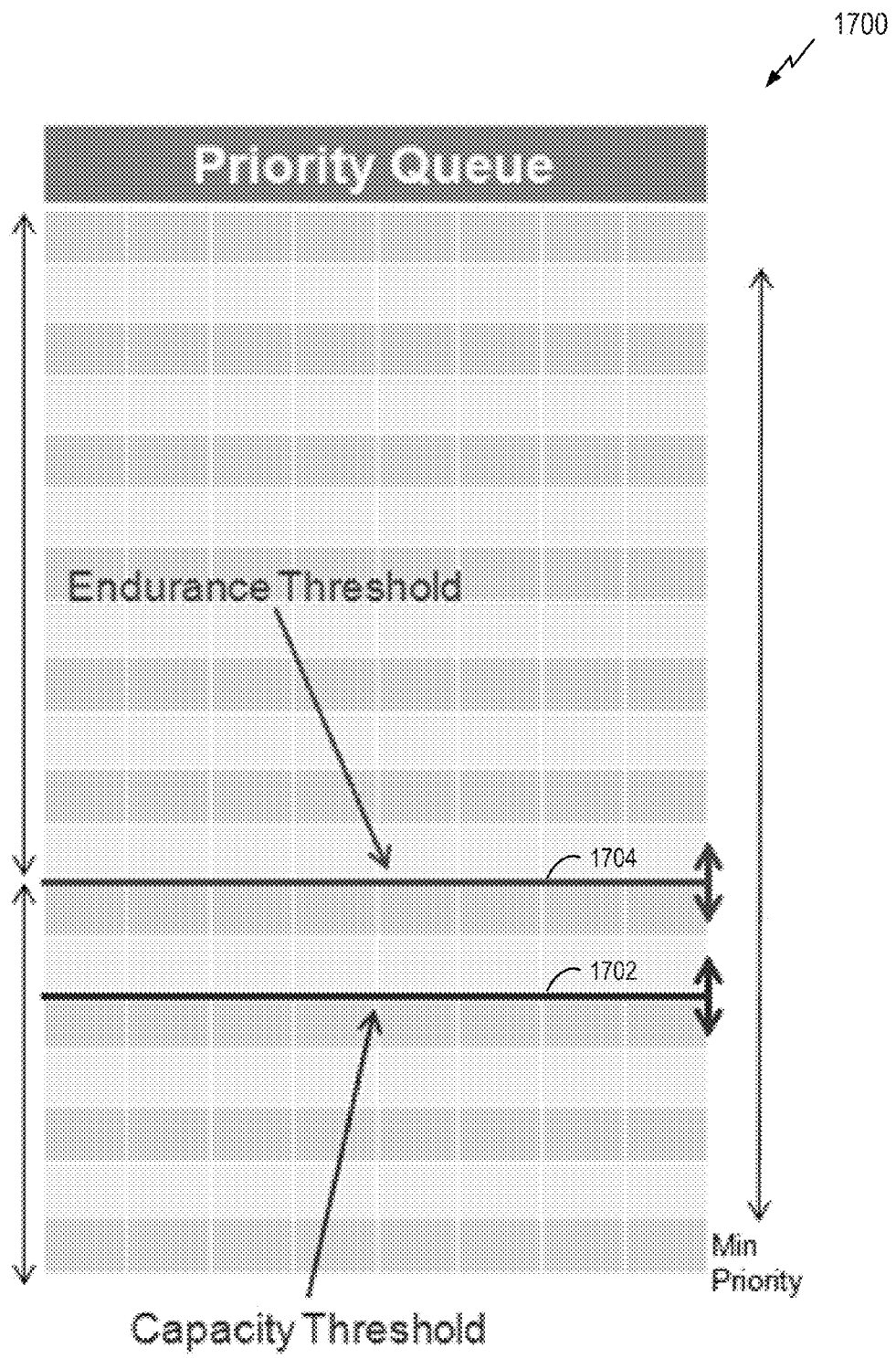
FIG. 17 is a diagram illustrating an example operation of a priority queue (PQ) monitor with two threshold priority levels for deciding NVM inclusion in accordance with one embodiment of the disclosure.

FIG. 17 is a diagram illustrating an example operation of a priority queue (PQ) monitor 1700 with two threshold priority levels for deciding NVM inclusion in accordance with one embodiment of the disclosure. The two thresholds include a capacity threshold 1702 and an endurance threshold 1704 related to the endurance of the NVM.

In one aspect, unlike various solid state drives, hybrid endurance management may not involve throttling of host writes. A priority queue can minimize writes by preferring smaller, infrequently written items and setting the initial capacity threshold to constrain write amplification.

In one aspect, the endurance threshold provides an endurance control system with a second priority queue threshold. In such case, the higher value of the endurance and capacity thresholds may determine the write policy for the NVM. In one aspect, credit-based accounting of endurance with some up-front allowance for initial fill (e.g., good burst capabilities) provides improved efficiency and performance.

In one aspect, as write credit is exhausted, the endurance threshold increases. In another aspect, there is an option to increase write and transfer length penalties in the priority queue, including for example increasing the number of levels written entries are decremented by or the rate at which a command's length decreases the starting priority level of entries created by it.

In one aspect, measurement noise close to either boundary may drive additional writes, and debouncing may be an option.

Figure 18:
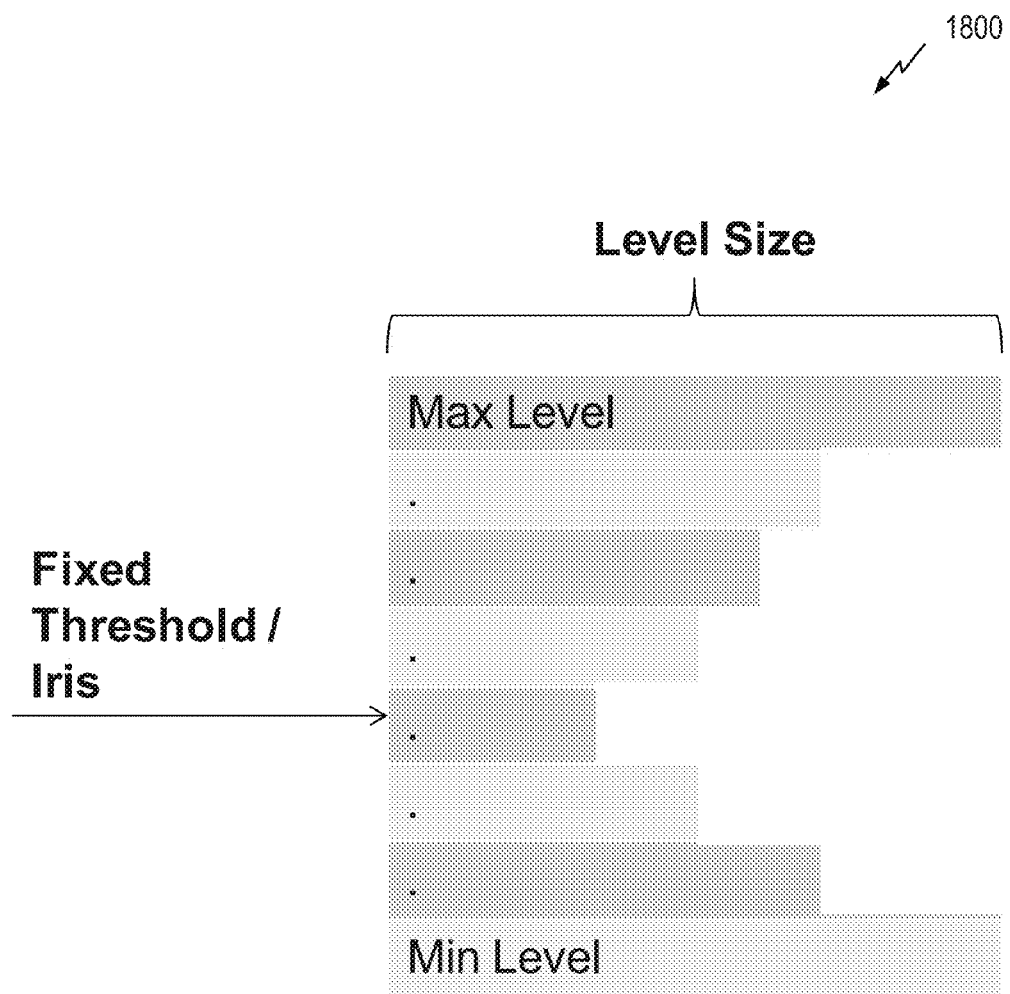
FIG. 18 is a diagram illustrating level arrangements for a priority queue (PQ) monitor in accordance with one embodiment of the disclosure.

FIG. 18 is a diagram illustrating level arrangements 1800 for a priority queue (PQ) monitor in accordance with one embodiment of the disclosure. The illustrated level arrangements 1800 involve shaped level sizes that provide greater granularity at the point of decision. The shaped level sizes may also allow the levels to expand and contract to perfectly match the number of entries that will fill an NVM target (such as a particular ribbon with a fixed number of storage elements) and permit upward mobility against the pressure of background noise.

Figure 19:
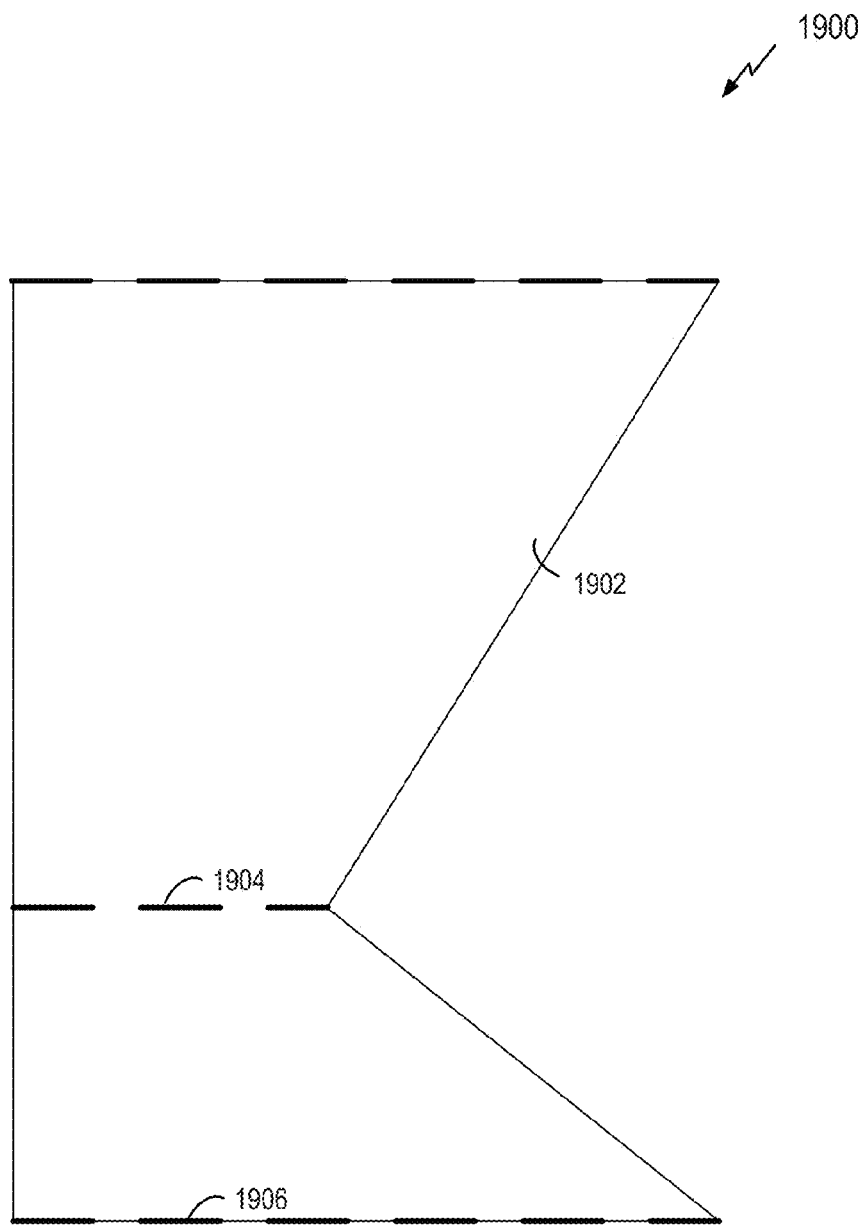
FIG. 19 is a diagram illustrating operation of a priority queue (PQ) monitor having shaped levels in accordance with one embodiment of the disclosure.

FIG. 19 is a diagram illustrating operation of a priority queue (PQ) monitor having shaped levels 1900 in accordance with one embodiment of the disclosure. The diagram illustrates three control points. The top 1902 may control the volume of in-NVM space (top two thirds of shape). The middle 1904 may balance upward and downward pressure through the iris. The bottom 1906 may balance upward and downward pressure in the lower levels.

In one aspect, false positives and decreasing in-NVM space may create downward pressure on the lower third. In such case, good candidates can be competing against other good candidates, and not the background noise.

Figure 20:
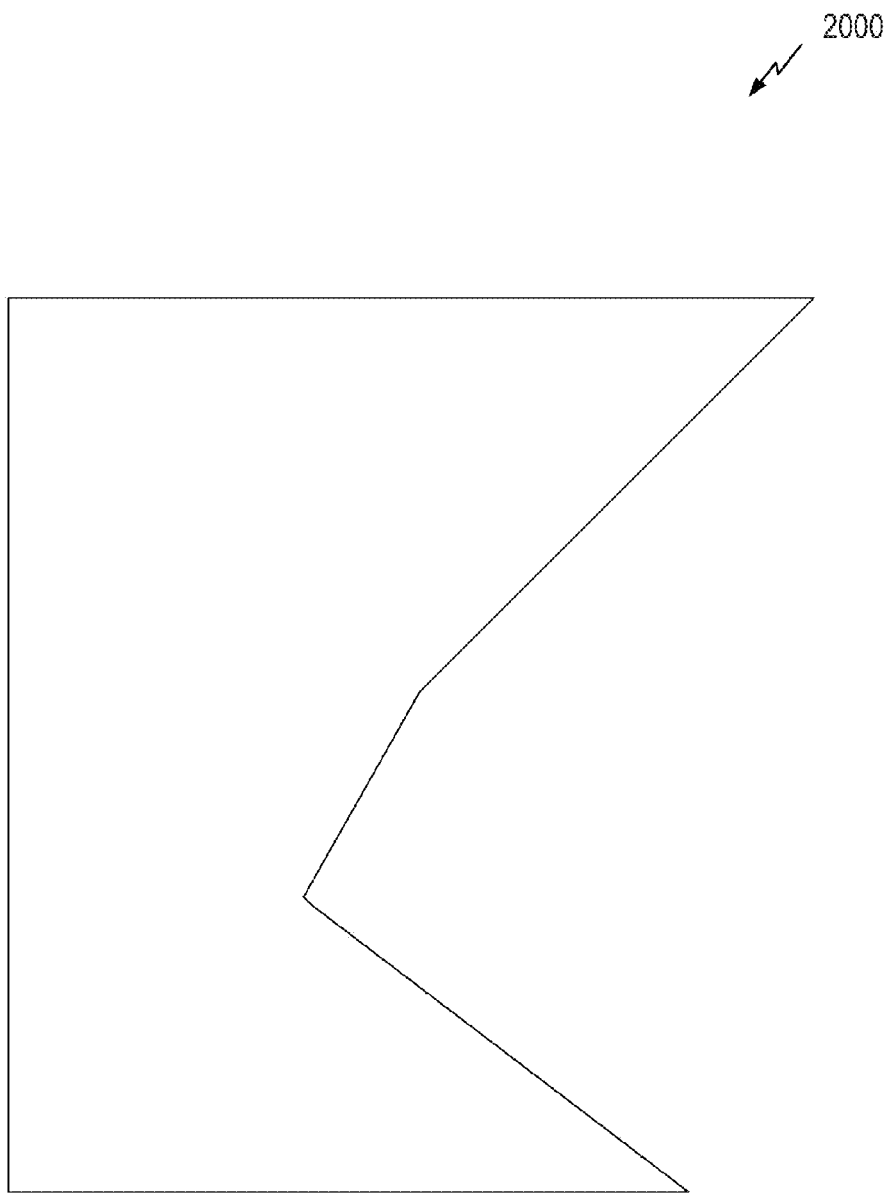
FIG. 20 is a diagram illustrating operation of a priority queue (PQ) monitor having shaped levels at an initial stage in accordance with one embodiment of the disclosure.

FIG. 20 is a diagram illustrating operation of a priority queue (PQ) monitor having shaped levels 2000 at an initial stage in accordance with one embodiment of the disclosure. In one aspect, the NVM is initially empty and the top control may grow like a balloon being stretched to create a vacuum pulling entries in. In such case, the iris shrinks as upward traffic meets no resistance from downward traffic.

Figure 21:
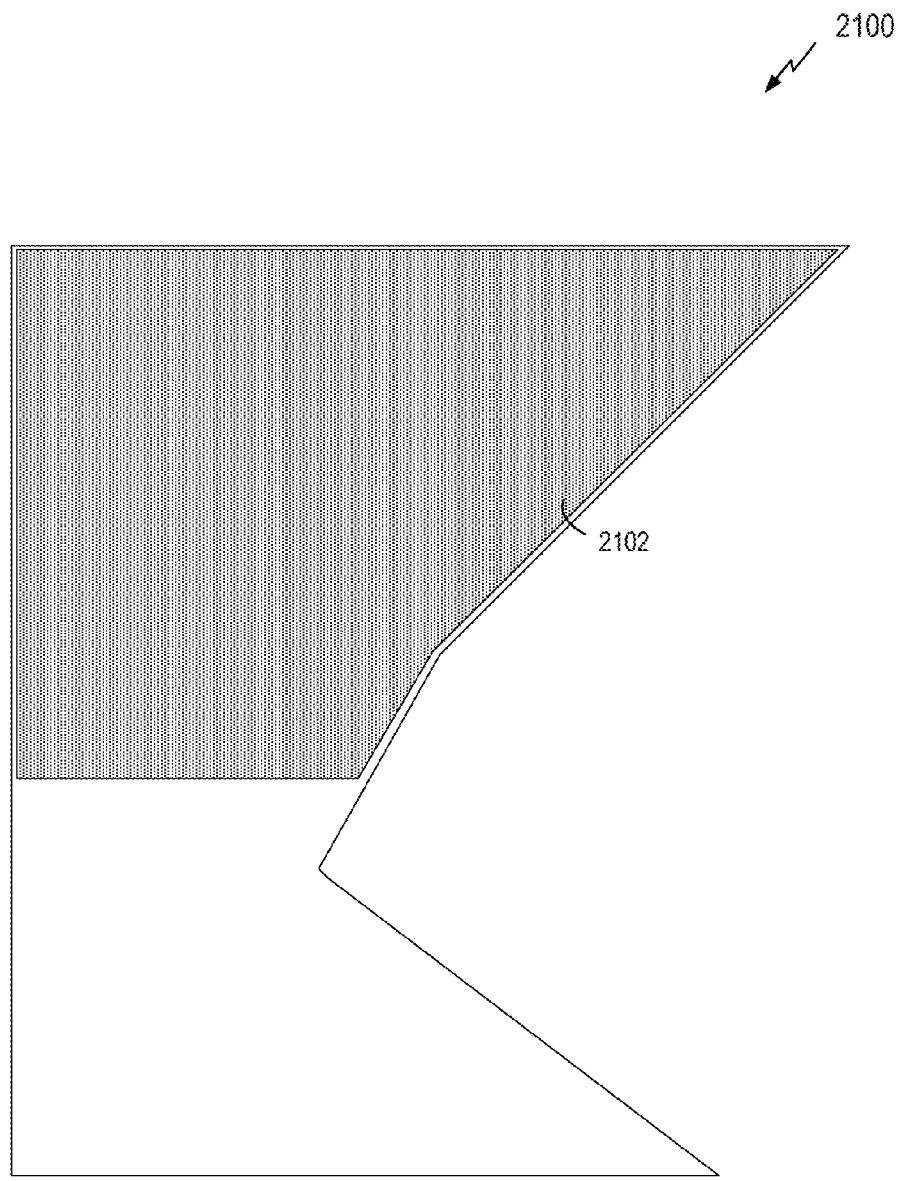
FIG. 21 is a diagram illustrating operation of a priority queue (PQ) monitor having shaped levels as the NVM becomes full in accordance with one embodiment of the disclosure.

FIG. 21 is a diagram illustrating operation of a priority queue (PQ) monitor having shaped levels 2100 as the NVM becomes full in accordance with one embodiment of the disclosure. In one aspect, as the NVM becomes full, the top control 2102 has expanded so far that most in-NVM entries will be in the top level 2102 and the levels between the bottom and the iris will be close to empty. In such case, the top control may shrink, forcing those entries to competitively order themselves throughout the levels. As constriction begins to force entries back out of the NVM, the space may stabilize to maintain a volume perfectly matched to the need despite entries of any size distribution.

While the above description contains many specific embodiments of the invention, these should not be construed as limitations on the scope of the invention, but rather as examples of specific embodiments thereof. Accordingly, the scope of the invention should be determined not by the embodiments illustrated, but by the appended claims and their equivalents.

The various features and processes described above may be used independently of one another, or may be combined in various ways. All possible combinations and sub-combinations are intended to fall within the scope of this disclosure. In addition, certain method, event, state or process blocks may be omitted in some implementations. The methods and processes described herein are also not limited to any particular sequence, and the blocks or states relating thereto can be performed in other sequences that are appropriate. For example, described tasks or events may be performed in an order other than that specifically disclosed, or multiple may be combined in a single block or state. The example tasks or events may be performed in serial, in parallel, or in some other suitable manner. Tasks or events may be added to or removed from the disclosed example embodiments. The example systems and components described herein may be configured differently than described. For example, elements may be added to, removed from, or rearranged compared to the disclosed example embodiments.

What is claimed is:

1. A method for deciding whether to store data in a non-volatile memory (NVM) storage portion of a hybrid drive comprising the NVM storage portion and a disk storage portion, the method comprising:
   generating a queue for storing a plurality of candidate addresses and a priority level for each of the plurality of candidate addresses;
   receiving a read command and a range of addresses for the disk storage portion of the hybrid drive, wherein the range of addresses corresponds to the read command;

determining a relative distance between reads of a first address, wherein the relative distance is a count of the number of read commands between the reads of the first address, and wherein the first address comprises either a second address within the range of addresses or a truncated version of the second address;

storing, when the relative distance is less than a relative distance threshold, a first candidate address and a respective priority level in the queue, wherein the first candidate address comprises either the second address or a truncated version of the second address; and storing, when the priority level of the first candidate address is greater than a priority level threshold, data corresponding to the first candidate address in the NVM storage portion of the hybrid drive.

2. The method of claim 1, further comprising:
increasing, when one or more read commands of the second address is performed, the priority level for the first candidate address.

3. The method of claim 2, further comprising:
decreasing, when one or more write commands of the second address is performed, the priority level for the first candidate address.

4. The method of claim 1, wherein the storing, when the relative distance is less than the relative distance threshold, the first candidate address and the respective priority level in the queue comprises:
determining the respective priority level for the first candidate address based on the relative distance; and
storing, when the relative distance is less than the relative distance threshold, the first candidate address and the respective priority level in the queue.

5. The method of claim 1, further comprising:
determining a relative distance between reads of a third address, wherein the third address comprises either a fourth address within the range of addresses or a truncated version of the fourth address;
storing, when the relative distance of the third address is less than the relative distance threshold, a second candidate address and a respective priority level in the queue, wherein the second candidate address comprises either the fourth address or a truncated version of the fourth address; and
determining an aggregate of the priority level for the first candidate address and the second candidate address;
wherein the storing, when the priority level of the first candidate address is greater than the priority level threshold, the data corresponding to the first candidate address in the NVM storage portion of the hybrid drive comprises:
storing, when the aggregate is greater than a second preselected threshold, the data corresponding to the first candidate address and data corresponding to the second candidate address in the NVM storage portion of the hybrid drive.

6. The method of claim 1, wherein the first address and the second address are identical.

7. The method of claim 1, wherein the first address is a truncated version of the second address.

8. The method of claim 7, further comprising:
removing a first preselected number of sequential bits starting at the least significant bit of the second address to form the first address.

9. The method of claim 7, further comprising:
splitting the first address into a slot value and a residual value, wherein the queue is implemented using an array having at least one index of slot values.

10. The method of claim 7, further comprising:
hashing the first address to remove locality; and
splitting the hashed first address into a slot value and a residual value, wherein the queue is implemented using an array having at least one index of slot values.

11. The method of claim 1, further comprising:
maintaining a count of entries in the queue at each priority level in the plurality of priority levels; and
decreasing a priority level of a preselected entry in the queue if the count of entries for the priority level of the preselected entry is greater than a priority level threshold.

12. The method of claim 1, further comprising:
maintaining a count of entries in the queue at each priority level in the plurality of priority levels;
maintaining a list of candidate addresses for each priority level in the plurality of priority levels;
determining whether the count of entries of a first priority level in the plurality of priority levels is greater than a priority level threshold;
selecting, if the count of entries of the first priority level is greater than the priority level threshold, a victim from the list of candidate addresses at the first priority level; and
decreasing, if the count of entries of the first priority level is greater than the priority level threshold, a priority level of the entry in the queue corresponding to the victim.

13. The method of claim 1, further comprising:
maintaining a list of candidate addresses for each priority level in the plurality of priority levels;
identifying a second candidate address in the queue for a priority promotion;
selecting a victim from the list of candidate addresses having a priority level higher than that of the second candidate address;
storing the priority level of the second candidate address as a former priority level;
setting the priority level of the second candidate address to the priority level of the victim; and
setting the priority level of the victim to the former priority level of the second candidate address.

14. The method of claim 1, further comprising:
maintaining a count of entries in the queue at each priority level in the plurality of priority levels; and
setting a maximum count threshold for each priority level based on a size of storage available in the NVM storage portion of the hybrid drive.

15. A method for deciding whether to store data in a non-volatile memory (NVM) storage portion of a hybrid drive comprising the NVM storage portion and a disk storage portion, the method comprising:
generating a queue for storing a plurality of candidate addresses and a priority level for each of the plurality of candidate addresses;
increasing, when a read command of a first candidate address of the plurality of candidate addresses is performed, the priority level for the first candidate address;
decreasing, when a write command of the first candidate address is performed, the priority level for the first candidate address; and
storing, when the priority level for the first candidate address is greater than a preselected threshold, data corresponding to the first candidate address in the NVM storage portion of the hybrid drive.

16. The method of claim 15:
wherein the read command comprises a range of addresses in the disk storage portion of the hybrid drive;
wherein the generating the queue for storing the plurality of candidate addresses and the priority level for each of the plurality of candidate addresses comprises:
 generating the queue for storing the plurality of candidate addresses and the priority level for each of the plurality of candidate addresses;
 determining a relative distance between reads of a first address, wherein the relative distance is a count of the number of read commands between the reads of the first address, and wherein the first address comprises either a second address within the range of addresses or a truncated version of the second address; and
 storing, when the relative distance is less than a relative distance threshold, a second candidate address and a respective priority level in the queue, wherein the first candidate address comprises either the second address or a truncated version of the second address.

17. The method of claim 16, further comprising:
determining the respective priority level for the second candidate address based on the relative distance.

18. The method of claim 16, further comprising:
splitting the first address into a slot value and a residual value, wherein the queue is implemented using an array having at least one index of slot values,
wherein the first address comprises a truncated version of the second address.

19. The method of claim 16, further comprising:
hashing the first address to remove locality; and
splitting the hashed first address into a slot value and a residual value, wherein the queue is implemented using an array having at least one index of slot values,
wherein the first address comprises a truncated version of the second address.

20. The method of claim 15, further comprising:
maintaining a count of entries in the queue at each priority level in the plurality of priority levels; and
decreasing a priority level of a preselected entry in the queue if the count of entries for the priority level of the preselected entry is greater than a priority level threshold.

21. The method of claim 15, further comprising:
maintaining a count of entries in the queue at each priority level in the plurality of priority levels;
maintaining a list of candidate addresses for each priority level in the plurality of priority levels;
determining whether the count of entries of a first priority level in the plurality of priority levels is greater than a priority level threshold;
selecting, if the count of entries of the first priority level is greater than the priority level threshold, a victim from the list of candidate addresses at the first priority level; and
decreasing, if the count of entries of the first priority level is greater than the priority level threshold, a priority level of the entry in the queue corresponding to the victim.

22. The method of claim 15, further comprising:
maintaining a list of candidate addresses for each priority level in the plurality of priority levels;
identifying a third candidate address in the queue for a priority promotion;
selecting a victim from the list of candidate addresses having a priority level higher than that of the third candidate address;
storing the priority level of the third candidate address as a former priority level;
setting the priority level of the third candidate address to the priority level of the victim; and
setting the priority level of the victim to the former priority level of the third candidate address.

23. The method of claim 15, further comprising:
maintaining a count of entries in the queue at each priority level in the plurality of priority levels; and
setting a maximum count threshold for each priority level based on a size of storage available in the NVM storage portion of the hybrid drive.

24. The method of claim 15, wherein the storing, when the priority level for the first candidate address is greater than the preselected threshold, the data corresponding to the first candidate address in the NVM storage portion of the hybrid drive comprises:
 determining an aggregate of priority levels for a second plurality of candidate addresses corresponding to addresses in a range of addresses of the read command; and
 storing, when the aggregate is greater than a second preselected threshold, data corresponding to the second plurality of candidate addresses in the NVM storage portion of the hybrid drive.

* * * * *